US012690746B2

(12) United States Patent
Kim et al.

(10) Patent No.: US 12,690,746 B2
(45) Date of Patent: Jul. 28, 2026

(54) DISHWASHER INCLUDING HEAT PUMP APPARATUS

(71) Applicant: LG ELECTRONICS INC., Seoul (KR)

(72) Inventors: Seungyoun Kim, Seoul (KR); Hoo Sun Lee, Seoul (KR); Kwangsoo Jung, Seoul (KR); Byung-Soon Kim, Seoul (KR); Doo Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 434 days.

(21) Appl. No.: 18/212,920

(22) Filed: Jun. 22, 2023

(65) Prior Publication Data

US 2023/0414060 A1     Dec. 28, 2023

(30) Foreign Application Priority Data

Jun. 24, 2022    (KR) ........................ 10-2022-0077372

(51) Int. Cl.
*A47L 15/00* (2006.01)
*A47L 15/22* (2006.01)
(Continued)

(52) U.S. Cl.
CPC ....... *A47L 15/4285* (2013.01); *A47L 15/0047* (2013.01); *A47L 15/22* (2013.01); *A47L 15/4291* (2013.01); *A47L 15/483* (2013.01); *A47L 15/486* (2013.01); *F24H 4/02* (2013.01); *F24H 4/06* (2013.01); *F25B 5/02* (2013.01); *F25B 13/00* (2013.01); *F25B 30/02* (2013.01); *F25B 41/20* (2021.01);
(Continued)

(58) Field of Classification Search
None
See application file for complete search history.

(56) References Cited

U.S. PATENT DOCUMENTS 3,986,345 A      10/1976  Pilz et al.
2017/0000310 A1*  1/2017  Disch ...................... A47L 15/24

FOREIGN PATENT DOCUMENTS

CN        109077688 A    12/2018
EP        2064982        6/2012
(Continued)

OTHER PUBLICATIONS

Extended European Search Report in European Appln. No. 23179676.4, mailed on Nov. 7, 2023, 8 pages.

*Primary Examiner* — Levon J Shahinian
(74) *Attorney, Agent, or Firm* — Fish & Richardson P.C.

(57) ABSTRACT

A dishwasher includes a tub defining a washing space and accommodating dishes and a heat pump apparatus configured to heat wash water introduced into the tub. The heat pump apparatus includes a compressor configured to compress refrigerant, a first heat exchanger configured to heat water introduced into the tub, a first expansion valve configured to expand refrigerant, a second heat exchanger to which refrigerant is introduced from the first expansion valve, a second expansion valve disposed in parallel with the first expansion valve, a third heat exchanger disposed in parallel with the second heat exchanger, and a four way valve connected with the compressor, the first heat exchanger, the second heat exchanger, and the third heat exchanger and configured to change a flow path of the refrigerant.

20 Claims, 17 Drawing Sheets

(51) Int. Cl.

| | | |
|---|---|---|
| *A47L 15/42* | (2006.01) |
| *A47L 15/48* | (2006.01) |
| *F24H 4/02* | (2022.01) |
| *F24H 4/06* | (2006.01) |
| *F25B 5/02* | (2006.01) |
| *F25B 13/00* | (2006.01) |
| *F25B 30/02* | (2006.01) |
| *F25B 41/20* | (2021.01) |

(52) U.S. Cl.
CPC ........ *A47L 2501/06* (2013.01); *A47L 2501/11* (2013.01); *F25B 2313/02741* (2013.01); *F25B 2400/0411* (2013.01); *Y02B 30/52* (2013.01)

(56) References Cited

FOREIGN PATENT DOCUMENTS

| | | | |
|---|---|---|---|
| JP | 2007125198 A | 5/2007 |
| WO | WO 2021/239125 A1 | 12/2021 |

* cited by examiner

DISHWASHER INCLUDING HEAT PUMP APPARATUS

CROSS-REFERENCE TO RELATED APPLICATION

This application claims priority to and benefit of Korean Patent Application No. 10-2022-0077372 filed on Jun. 24, 2022, which is hereby incorporated by reference as if fully set forth herein.

TECHNICAL FIELD

The present disclosure relates to a dishwasher, more particularly, a dishwasher including a heat pump apparatus with a structure of improved energy efficiency.

BACKGROUND

Details in the background section do not constitute the related art but are given only as background information concerning the subject matter of the present disclosure.

A dishwasher is an electric appliance that washes dishes and cooking utensils stored inside by spraying wash water. At this time, the wash water used in the washing may include a washing detergent.

A conventional dishwasher may include a tub defining a washing space, a storage part accommodating washing targets inside the tub, a spray arm spraying wash water to the storage part, and a sump storing wash water and supplying the wash water to the spray arm.

By using the dishwasher, it is possible to reduce the time and effort required for washing dishes after eating, thereby contributing to user convenience.

When the dishwasher is used to wash dishes, wash water may be heated and used in order to increase a washing effect. An electric heater may be used as a heating device for heating wash water. Meanwhile, as another method, wash water may be heated by a heat pump apparatus instead of the electric heater.

The heat pump apparatus has high energy efficiency, compared with the electric heater. Accordingly, when wash water is heated by using the heat pump apparatus, electricity consumption can be reduced.

In some cases, a dishwasher has a structure including a heat pump to heat wash water.

A case in which heat is supplied to a tub in the dishwasher is when a washing mode and a drying mode area performed. In the washing mode, wash water is heated and sprayed to the tub to increase washing efficiency for dishes. In the drying mode for drying the washed dishes, heated air is supplied to the tub to increase drying efficiency for the dishes accommodated inside the tub.

A heat pump apparatus is configured to heat wash water in the washing mode and heat air supplied to the tub in the drying mode. Water and air have different specific heats. Since it has a lower specific heat than water, air can reach the same high temperature as water by receiving a relatively small amount of heat, compared to water.

Accordingly, the amount of heat supplied to wash water in the washing mode and the amount of heat supplied to air in the drying mode need not be the same. When a heat pump supplies the same amount of heat to wash water in the washing mode and air in the drying mode, energy efficiency could be deteriorated.

Accordingly, the heat pump apparatus needs to be designed to supply an optimal amount of heat in the washing mode supplying a relatively large amount of heat and an optimal amount of heat in the drying mode supplying a relatively small amount of heat.

SUMMARY

One objective of the present disclosure is to provide a dishwasher having an improved energy efficiency structure that may heat wash water and air by using a heat pump apparatus, compared to an electric heater.

A further objective of the present disclosure is to provide a dishwasher including a heat pump apparatus with a structure of heating both wash water and air, which are supplied to a tub.

A still further objective of the present disclosure is to provide a dishwasher including a heat pump apparatus designed to supply an optimal amount of heat in a washing mode supplying a relatively large amount of heat and an optimal amount of heat in a drying mode supplying a relatively small amount of heat.

A still further objective of the present disclosure is to provide a dishwasher including a heat pump apparatus that has a structure of increasing the number of evaporators as the size of required heat increases.

Aspects according to the present disclosure are not limited to the above ones, and other aspects and advantages that are not mentioned above can be clearly understood from the following description and can be more clearly understood from the embodiments set forth herein.

A dishwasher according to an embodiment may include a heat pump apparatus. The heat pump apparatus is provided to have a coefficient of performance (COP) exceeding 1. Accordingly, the heat pump apparatus provided in the dishwasher according to the embodiment may have increased energy efficiency in heating wash water and air, compared to the conventional dishwasher heating wash water by using the electric heater.

The heat pump apparatus may include a compressor configured to compress refrigerant; a first heat exchanger to which refrigerant is introduced from the compressor, the first heat exchanger configured to heat water introduced into the tub; a first expansion valve to which refrigerant is introduced from the first heat exchanger, the first expansion valve configured to expand refrigerant; a second heat exchanger to which refrigerant is introduced from the first expansion valve; a second expansion valve disposed in parallel with the first expansion valve, the second expansion valve to which refrigerant is introduced from the first heat exchanger; and a third heat exchanger disposed in parallel with the second heat exchanger, the third heat exchanger to which refrigerant is introduced from the second expansion valve.

Based on an operational mode of the dishwasher, the role of the first heat exchanger to the third heat exchanger may be changed to a condenser or an evaporator. When the dishwasher performs a washing mode, the heat pump apparatus may heat wash water. When the dishwasher performs a washing mode, the heat pump apparatus may heat wash water and when it performs a drying mode, the heat pump apparatus may heat air. Accordingly, the heat pump apparatus may heat both wash water and air.

When the dishwasher performs the washing mode, the first heat exchanger may be operated as a condenser and the second heat exchanger and the third heat exchanger may be operated as an evaporator, thereby effectively heating water having a relatively high specific heat.

When the dishwasher performs the drying mode, the first heat exchanger may not be used, the second heat exchanger may be operated as the evaporator and the third heat exchanger may be operated as the condenser. Accordingly, a smaller amount of heat than the amount of the amount of heat supplied to water in the washing mode may be supplied to air having a relatively low specific heat, thereby effectively heating the air. The supply of excessive heat can be suppressed, thereby improving the energy efficiency of the heat pump apparatus.

The heat pump apparatus may include a four way valve connected with the compressor, the first heat exchanger, the second heat exchanger and the third heat exchanger and configured to change a flow path of a refrigerant.

The role of the first heat exchanger to the third heat exchanger may be variable by the four way valve changing the flow path of refrigerant. Based on the operation of the four way valve, two evaporators may be used in the washing mode requiring a relatively large heat supply amount and one evaporator may be used in the drying mode requiring a relatively small heat supply amount.

A dishwasher according to an embodiment may include a heat pump apparatus a tub defining a washing space and accommodating dishes; and a heat pump apparatus configured to heat wash water introduced into the tub, The heat pump apparatus may include a compressor configured to compress refrigerant; a first heat exchanger to which refrigerant is introduced from the compressor, the first heat exchanger configured to heat water introduced into the tub; a first expansion valve to which refrigerant is introduced from the first heat exchanger, the first expansion valve configured to expand refrigerant; a second heat exchanger to which refrigerant is introduced from the first expansion valve; a second expansion valve disposed in parallel with the first expansion valve, the second expansion valve to which refrigerant is introduced from the first heat exchanger; a third heat exchanger disposed in parallel with the second heat exchanger, the third heat exchanger to which refrigerant is introduced from the second expansion valve; and a four way valve connected with the compressor, the first heat exchanger, the second heat exchanger and the third heat exchanger and configured to change a flow path of a refrigerant.

The heat pump apparatus may include a first pipe connecting the four way valve and the compressor with each other; a second pipe connecting the four way valve and the first heat exchanger with each other; a third pipe connecting the four way valve and the second heat exchanger with each other; a fourth pipe connecting the four way valve and the third heat exchanger with each other; and a fifth pipe connecting the second heat exchanger and the compressor with each other, and the third pipe is connected with the fifth pipe.

A first check valve may be provided in the third pipe and configured to block refrigerant from flowing in the four way valve from the fifth pipe.

The heat pump apparatus may include a blowing fan disposed to face the second heat exchanger and the third heat exchanger and configured to blow air toward the second heat exchanger and the third heat exchanger.

The heat pump apparatus may include a bypass pipe connected to both sides of the second expansion valve; and a second check valve disposed in the bypass pipe and configured to block a refrigerant from flowing from an inlet to an outlet of the second expansion valve.

The heat pump apparatus may include a sixth pipe having one side connected to the first heat exchanger and the other side connected with the first expansion valve, the second expansion valve and the bypass pipe; and a third check valve disposed in the sixth pipe and configured to block a refrigerant from flowing to the first heat exchanger from at least one of the first expansion valve, the second expansion valve and the bypass pipe.

The dishwasher may further include a spray arm provided in the tub and spraying wash water. Wash water introduced from the tub may be heated while passing through the first heat exchanger and transferred to the tub to be sprayed through the spray arm.

When the dishwasher performs a washing mode, the four way valve may connect the first pipe and the second pipe with each other and also connects the third pipe and the fourth pipe with each other.

When the dishwasher performs a washing mode, a refrigerant discharged from the compressor may be introduced to the first heat exchanger after passing through the first pipe and the second pipe, and a refrigerant discharged from the second heat exchanger may be introduced to the compressor after passing through the fifth pipe, and a refrigerant discharged from the third heat exchanger may be introduced to the compressor after sequentially passing through the fourth pipe, the third pipe and the fifth pipe.

When the dishwasher performs a washing mode, the first heat exchanger may be operated as a condenser configured to heat wash water and condense a refrigerant by transmitting heat to the wash water from the refrigerant, and the second heat exchanger and the third heat exchanger may be operated as an evaporator configured to evaporate a refrigerant by transferring heat to the refrigerant from air.

When the dishwasher performs a drying mode, the four way valve may connect the first pipe and the fourth pipe with each other, and separate the second pipe and the third pipe from the first pipe and the fourth pipe.

When the dishwasher performs a drying mode, a refrigerant discharged from the compressor may be introduced to the third heat exchanger after passing through the first pipe and the fourth pipe, a refrigerant discharged from the second heat exchanger may be introduced to the compressor after passing through the fifth pipe, and flow of the refrigerant into the first heat exchanger may be blocked by the first check valve and the third check valve.

When the dishwasher performs a drying mode, the second heat exchanger may be operated as an evaporator configured to evaporate a refrigerant by transferring heat to the refrigerant from air, and the third heat exchanger may be operated as a condenser configured to heat air and condense a refrigerant by transferring heat to the air from the refrigerant.

When the dishwasher performs a washing mode, the second expansion valve may be open, and when the dishwasher performs a drying mode, the second expansion valve may be closed.

The blowing fan may blow air introduced from the tub toward the second heat exchanger and the third heat exchanger, and when the dishwasher performs a washing mode, the air having passed through the third heat exchanger may be discharged to the outside of the tub, and when the dishwasher performs a drying mode, the air having passed through the third heat exchanger may be introduced to the tub.

A heat pump apparatus according to an embodiment provided in a dishwasher may include a compressor configured to compress refrigerant; a first heat exchanger to which refrigerant is introduced from the compressor, the first heat exchanger configured to heat water introduced into the tub; a first expansion valve to which refrigerant is introduced from the first heat exchanger, the first expansion valve configured to expand refrigerant; a second heat exchanger to which refrigerant is introduced from the first expansion valve; a second expansion valve disposed in parallel with the first expansion valve, the second expansion valve to which refrigerant is introduced from the first heat exchanger; a third heat exchanger disposed in parallel with the second heat exchanger, the third heat exchanger to which refrigerant is introduced from the second expansion valve; a four way valve connected with the compressor, the first heat exchanger, the second heat exchanger and the third heat exchanger and configured to change a flow path of a refrigerant; and a blowing fan disposed to face the second heat exchanger and the third heat exchanger and configured to blow air toward the second heat exchanger and the third heat exchanger.

When the dishwasher performs a washing mode, the first heat exchanger may be operated as a condenser configured to heat wash water and condense a refrigerant by transmitting heat to the wash water from the refrigerant, and the second heat exchanger and the third heat exchanger may be operated as an evaporator configured to evaporate a refrigerant by transferring heat to the refrigerant from air. when the dishwasher performs a drying mode, the second heat exchanger may be operated as an evaporator configured to evaporate a refrigerant by transferring heat to the refrigerant from air, the third heat exchanger may be operated as a condenser configured to heat air and condense a refrigerant by transferring heat to the air from the refrigerant, and flow of the refrigerant into the first heat exchanger may be blocked to limit heat exchange between the refrigerant and wash water.

A heat pump apparatus according to an embodiment may include a compressor configured to compress refrigerant; a first heat exchanger to which refrigerant is introduced from the compressor, the first heat exchanger configured to heat water introduced into the tub; a first expansion valve to which refrigerant is introduced from the first heat exchanger, the first expansion valve configured to expand refrigerant; a second heat exchanger to which refrigerant is introduced from the first expansion valve; a second expansion valve disposed in parallel with the first expansion valve, the second expansion valve to which refrigerant is introduced from the first heat exchanger; and a third heat exchanger disposed in parallel with the second heat exchanger, the third heat exchanger to which refrigerant is introduced from the second expansion valve.

Based on an operation mode of the dishwasher, the role of the first heat exchanger to the third heat exchanger may be changed to a condenser or an evaporator. When the dishwasher performs a washing mode, the heat pump apparatus may heat wash water and when the dishwasher performs a drying mode, the heat pump heat apparatus may heat air, so that the heat pump apparatus can heat both wash water and air.

When the dishwasher performs the washing mode, the first heat exchanger may be operated as the condenser, and the second heat exchanger and the third heat exchanger may be operated as the evaporator, thereby effectively heating water with a relatively large specific heat.

When the dishwasher performs the drying mode, the first heat exchanger may not be used, the second heat exchanger may be used as the evaporator, and the third heat exchanger may be operated as the condenser. Accordingly, a smaller amount of heat than the amount of the amount of heat supplied to water in the washing mode may be supplied to air having a relatively low specific heat, thereby effectively heating the air. The supply of excessive heat can be suppressed, thereby improving the energy efficiency of the heat pump apparatus.

The heat pump apparatus may include air flow part. The air flow part may include a first duct having an inlet connected with the tub and introducing air inside the tub to the air flow part; a blowing fan connected with the first duct and configured to forcibly blow air toward the air flow part; a second heat exchanger disposed to face the blowing fan and allowing refrigerant to flow therein from the first expansion valve; a third heat exchanger disposed to face the second heat exchanger and allowing refrigerant to flow therein from the second expansion valve; a damper device connected with the third heat exchanger and configured to change a flow path of air; and a second duct having an outlet connected with the tub and an inlet connected with the damper device.

Air inside the blowing fan may circulate between the air flow part and the tub. Since the air of the tub is forcibly blown to circulate the tub, the drying time may be reduced and drying efficiency may be improved, compared to circulation due to natural convection.

The heat pump apparatus may include a damper device. when the dishwasher performs the washing mode, the heat pump apparatus may use the damper device to heat wash water supplied to the tub and discharge the air forcibly circulating inside the heat pump apparatus to the outside of the tub. When the dishwasher performs the drying mode, the heat pump apparatus may use the damper device to heat air supplied to the tub and introduce the air forcibly flowing in the heat pump apparatus into the tub.

Accordingly, flow of the forcibly blown air into the tub may be blocked in the washing mode to prevent deterioration of washing efficiency due to the forcible flowing air. Only in the drying mode, air may be introduced to the tub so that drying efficiency in the tub may be improved.

A dishwasher according to an embodiment may include a tub defining a washing space and accommodating dishes; and a heat pump configured to heat wash water introduced to the tub.

When the dishwasher performs a washing mode, the heat pump apparatus may heat the wash water supplied to the tub and discharge air forcibly flowing therein to the outside of the tub. When the dishwasher performs a drying mode, the heat pump apparatus may heat the air supplied to the tub and introduce the air forcibly flowing therein into the tub.

The heat pump apparatus may include a compressor configured to compress refrigerant; a first heat exchanger to which refrigerant is introduced from the compressor, the first heat exchanger configured to heat water introduced into the tub; a first expansion valve to which refrigerant is introduced from the first heat exchanger, the first expansion valve configured to expand refrigerant; a second expansion valve disposed in parallel with the first expansion valve, the second expansion valve to which refrigerant is introduced from the first heat exchanger; and an air flow part connected with the tub, the air flow part in which air introduced from the tub flows.

The air flow part may include a first duct having an inlet connected with the tub and introducing air inside the tub to the air flow part; a blowing fan connected with the first duct and configured to forcibly blow air toward the air flow part; a second heat exchanger disposed to face the blowing fan and allowing refrigerant to flow therein from the first expansion valve; a third heat exchanger disposed to face the second heat exchanger and allowing refrigerant to flow therein from the second expansion valve; a damper device connected with the third heat exchanger and configured to change a flow path of air; and a second duct having an outlet connected with the tub and an inlet connected with the damper device.

The damper device may include a first discharge hole for discharging air introduced to the damper device to the outside of the duct; a first damper configured to selectively open and close the first discharge hole; and a second damper configured to selectively open and close an inlet of the first damper and an inlet of the second damper.

When the dishwasher performs the washing mode, the first discharge hole may be open and the inlet of the second duct may be closed so that the air introduced to the air flow part can be discharged to the outside of the tub. When the dishwasher performs the drying mode, the first discharge hole may be closed and the inlet of the second duct may be closed so that the air introduced to the air flow part can flow into the tub.

When the dishwasher performs the washing mode, the first damper may open the first discharge hole and the second damper may close the inlet of the second duct. When the dishwasher performs the drying mode, the first damper may close the first discharge hole and the second damper may open the inlet of the second duct.

The dishwasher may include a base provided under the tub and supporting the tub. The blowing fan, the second heat exchanger, the third heat exchanger and the damper device may be disposed in the base.

The first duct may include a first cell disposed outside the tub to face a lateral wall of the tub and provided in communication with the inside of the tub; and a second cell having one end that is in communication with the first cell and the other end that is in communication with the blowing fan, the second cell of which at least predetermined area is disposed in the base.

The second duct may include a first part having one end that is in communication with the damper device; and a second part in communication with the first part and protruding from the inside of the tub via a bottom plate of the tub, being in communication with the inside of the tub.

The dishwasher may include a sump provided under the tub and accommodating wash water. The sump may be disposed some area inside the base. The sump may be provided at a position that avoids the positions of the blowing fan, the second heat exchanger, the third heat exchanger and the damper device.

The dishwasher may include a four way valve connected with the compressor, the first heat exchanger, the second heat exchanger and the third heat exchanger and configured to change a flow path of a refrigerant.

The dishwasher may include a spray arm provided in the tub and spraying wash water. The wash water flowing from the tub may be heated while passing through the first heat exchanger and transferred to be sprayed through the spray arm.

The heat pump apparatus may include a first pipe connecting the four way valve and the compressor with each other; a second pipe connecting the four way valve and the first heat exchanger with each other; a third pipe connecting the four way valve and the second heat exchanger with each other; a fourth pipe connecting the four way valve and the third heat exchanger with each other; and a fifth pipe connecting the second heat exchanger and the compressor with each other, and the third pipe may be connected with the fifth pipe.

When the dishwasher performs the washing mode, the four way valve may connect the first pipe and the second pipe with each other and connect the third pipe and the fourth pipe with each other. When the dishwasher performs the drying mode, the four way valve may connect the first pipe and the fourth pipe with each other and separate the second pipe and the third pipe from the first pipe and the fourth pipe.

When the dishwasher performs the washing mode, the first heat exchanger may be operated as the condenser configured to heat wash water by transferring heat to the wash water from refrigerant, and the second heat exchanger and the third heat exchange may be operated as the evaporator configured to evaporate refrigerant by transferring heat to the refrigerant from air. When the dishwasher performs the drying mode, the second heat exchanger may be operated as the evaporator configured to evaporate refrigerant by transferring heat to the refrigerant from air and the third heat exchanger may be operated as the condenser configured to heat air and condense refrigerant by transferring heat to the air from the refrigerant. Heat exchange between the refrigerant and the wash water may be limited by blocking the flow of refrigerant into the first heat exchanger.

A heat pump according to an embodiment may include a compressor configured to compress refrigerant; a first heat exchanger to which refrigerant is introduced from the compressor, the first heat exchanger configured to heat water introduced into the tub; a first expansion valve to which refrigerant is introduced from the first heat exchanger, the first expansion valve configured to expand refrigerant; a second expansion valve disposed in parallel with the first expansion valve, the second expansion valve to which refrigerant is introduced from the first heat exchanger; and an air flow part connected with the tub, the air flow part in which air introduced from the tub flows. The air flow part may include a first duct having an inlet connected with the tub and introducing air inside the tub to the air flow part; a blowing fan connected with the first duct and configured to forcibly blow air toward the air flow part; a second heat exchanger disposed to face the blowing fan and allowing refrigerant to flow therein from the first expansion valve; a third heat exchanger disposed to face the second heat exchanger and allowing refrigerant to flow therein from the second expansion valve; a damper device connected with the third heat exchanger and configured to change a flow path of air; and a second duct having an outlet connected with the tub and an inlet connected with the damper device.

When the dishwasher performs the washing mode, the first discharge hole may be open and the inlet of the second duct may be closed so that the air introduced to the air flow part can be discharged to the outside of the tub. When the dishwasher performs the drying mode, the first discharge hole may be closed and the inlet of the second duct may be closed so that the air introduced to the air flow part can flow into the tub.

The damper device may include a first discharge hole for discharging air introduced to the damper device to the outside of the duct; a first damper configured to selectively open and close the first discharge hole; and a second damper configured to selectively open and close an inlet of the first damper and an inlet of the second damper.

The dishwasher including the heat pump apparatus may selectively heat wash water or air, thereby improving energy efficiency of the dishwasher, compared to the dishwasher using the electric heater.

The dishwasher including the heat pump apparatus may use the four way valve to change the flow path of the refrigerant, so that heat both the wash water and air supplied to the tub may be heated, thereby reducing the entire volume of the heat pump apparatus and effectively heating the wash water or air based on the operation mode of the dishwasher.

In addition, in the dishwasher including the heat pump apparatus according to the present disclosure, when heating wash water requiring a relatively large amount of heat, the plurality of evaporators may be used. When heating wash water requiring a relatively small amount of heat, one evaporator may be used. Due to this structure, the number of evaporators may be optimized based on the required amount of heat, thereby effectively reducing energy loss due to use of unnecessary devices.

In addition, in the dishwasher including the heat pump apparatus according to the present disclosure, the air forcibly blown by the blowing fan may circulate the tub and the air flow part. Accordingly, air may circulate inside the tub. Since the air circulates the tub smoothly, evaporation of wash water on the surfaces of the dishes accommodated in the tub may be promoted by the circulating air to effectively reduce the drying time, thereby improving drying efficiency of the dishwasher.

In addition, in the dishwasher including the heat pump apparatus according to the present disclosure, the path of the air forcibly flowing may be changed by the damper device. The air forcibly flowing in the air flow part may not be introduced to the tub in the washing mode but may be introduced to the tub in the drying mode. Accordingly, the air cooled to be a low temperature air while passing through the second heat exchanger and the third heat exchanger in the washing mode may not be introduced to the tub but discharged outside so that the tub may not be cooled by the low temperature air, thereby improving washing efficiency of the dishwasher.

Specific effects are described along with the above-described effects in the section of detailed description.

DESCRIPTION OF DRAWINGS

FIG. 4 is a piping view to describe an operation of a heat pump apparatus when heating wash water;

FIG. 9 is a view showing an area of a dishwasher in which an air flow part is disposed;

DESCRIPTION OF SPECIFIC EMBODIMENTS

Figure 1:
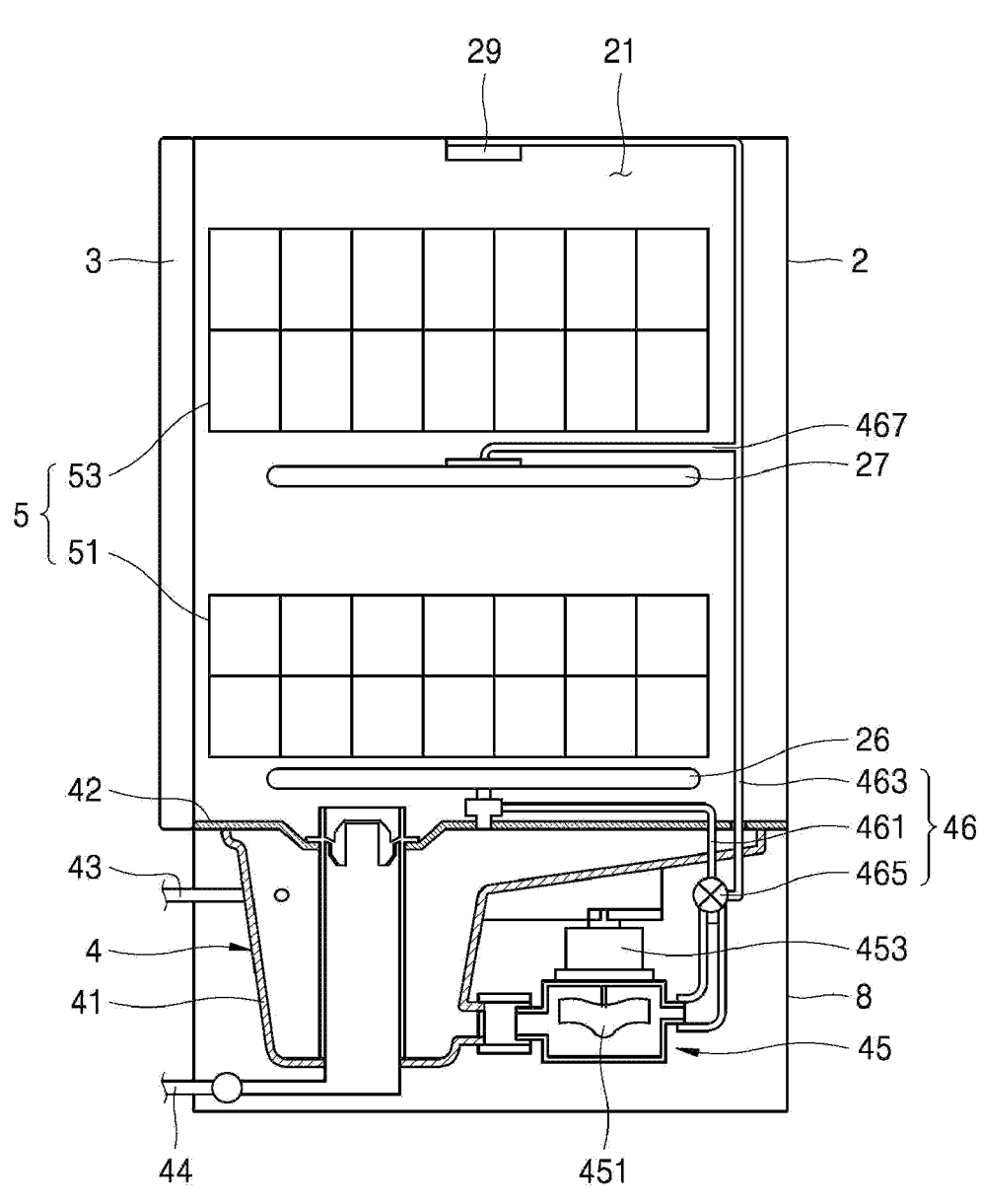
FIG. 1 is a schematic sectional view of a dishwasher according to an embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Throughout the disclosure, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

FIG. 1 is a schematic sectional view of a dishwasher according to an embodiment.

Referring to FIG. 1, the dishwasher may include a housing defining an exterior design; a tub 2 defining a washing space 21 inside the housing and accommodating dishes as washing targets; a door 3 rotatably coupled to a base 8 and disposed in front of the tub 2 to open and close the tub 2; a sump 4 provided under the tub and storing wash water; a storage part 5 provided inside the tub 2 and storing washing targets therein; and a spray arm 20 spraying wash water toward the washing targets stored in the storage part. At this time, the dishes may be bowls, plates, spoons and chopsticks and other cooking utensils, for example.

The tub 2 may define the washing space 21 and accommodate dishes. The storage part 5 and the spray arm 20 may be provided in the washing space 21. The tub may have one open surface and the open surface may be open and closed by the door 3.

The door 3 may be rotatably coupled to the housing to selectively open and close the washing space 21. For example, a lower portion of the door 3 may be hingedly coupled to the housing.

In this instance, the door 3 may rotatable on a hinge to open and close the tub 2. When the door 3 is open, the storage part 5 may be pulled out of the dishwasher and the pulled-out storage part 5 may be supported by the door 3.

The sump 4 may include a storage portion 41 storing wash water; a sump cover 42 that separates the storage portion 41 from the tub 2; a water supply portion 43 supplying wash water to the storage portion 41 from the outside; a water discharge portion discharging the wash water stored in the storage portion 41 to the outside; and a water supply pump 45 and a supply path 46 for supply the wash water of the storage portion 41 to the spray arm 20.

The sump cover 42 may be provided above the sump 4 to separate the sump 4 from the tub 2. The sump cover 42 may include a plurality of collecting holes for collecting holes for collecting the wash water sprayed into the washing space 21 through the spray arm 20.

Specifically, the wash water sprayed through the spray arm 20 may fall to a lower portion of the washing space 21, and may be collected again in the storage portion 41 of the sump 4 after passing through the sump cover 42.

The water supply pump 45 may be provided in a side or lower area of the storage portion 41, and configured to supply wash water to the spray arm 20.

One end of the water supply pump 45 may be connected with the storage portion 41 and the other end thereof may be connected to the supply path 46. An impeller 451, a motor 453, etc. may be provided inside the water supply pump 45. When the motor 453 is supplied electric power, the impeller 451 may rotate and the wash water stored in the storage portion 41 may be supplied to the spray arm 20 via the supply path 46.

The supply path 46 may selectively supply the wash water to the spray arm 20 from the water supply pump 45.

The supply path 46 may include a first supply path 461 connected to a lower spray arm 26, an upper spray arm 27, and a supply path conversion valve 465 for selectively opening and closing the supply paths 461, 463 and 467. At this time, the supply path conversion valve 465 may control the supply paths 461, 463 and 467 to be opened sequentially or simultaneously.

Figure 2:
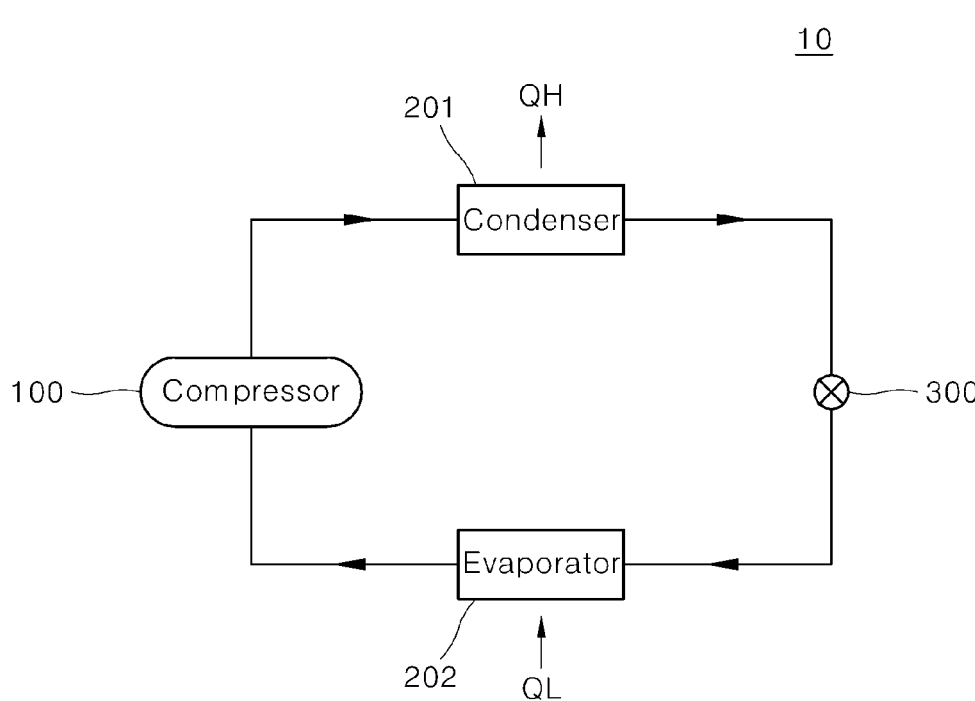
FIG. 2 is a piping view schematically showing a heat pump apparatus according to an embodiment.

At least one storage part 5 for storing dishes may be provided inside the washing space 21. FIG. 2 shows a dishwasher including two storage parts 5 but the embodiment is not limited thereto.

For example, the dishwasher may include only one storage part or three or more storage parts. In this instance, the number of the spray arms may be variable based on the number of the storage parts.

The storage part 5 may include a lower rack 51 and an upper rack 53 for storing dishes. The lower rack 51 may be disposed in the washing space 21 and dishes may be stored on the lower rack. The upper rack 53 may be disposed above the lower rack 51 and dishes may be stored on the upper rack. Meanwhile, a top rack may be disposed in a space defined between an upper area of the upper rack 53 and a top nozzle 29. Dishes may be stored on the top rack.

The lower rack 51 may be disposed above the sump 4 and the upper rack 53 may be disposed above the lower rack 51. The lower rack 51, the upper rack 53 and the top rack may be pulled out through the open surface of the tub 2.

To this end, a rail-type holder may be provided on an inner surface of the tub 2 and a wheel may be provided on a lower surface of the rack 51, 53. A user may pull out the storage part 5 and put dishes therein or take out the dishes having been washed.

The spray arm may be provided inside the tub 2 and configured to spray wash water toward the dishes stored in the storage part 5. The spray arm 20 may include a lower spray arm 26, an upper spray arm 27 and a top nozzle 29.

The lower spray arm 26 may be rotatably provided below the lower rack 51 and spray wash water to the dishes. The upper spray arm 27 may be rotatably provided between the lower rack 51 and the upper rack 53, and may spray wash water to the dishes.

The lower arm 26 may be rotatably mounted on the sump cover 42 and configured to spray wash water toward the dishes stored in the lower rack 51. The upper spray arm 27 may be disposed above the lower spray arm 26, to spray wash water toward the dishes stored in the upper rack 53. The top nozzle 29 may be provided in an upper area of the washing space 21 and configured to spray wash water to the lower rack 51 and the upper rack 53.

As described above, the first supply path 461 may supply wash water to the lower spray arm 26. The second supply path 463 and 467 may supply wash water to the upper spray arm 27 and the top nozzle 29.

Referring to FIG. 1, the dishwasher may include a base 8. The base may be disposed on a bottom of the tub 2 and the tub 2 may be mounted on the base 8. The base 8 may provide a space in which the sump 4 is accommodated, and also a space in which a pump, a hot air supply device and other various mechanisms provided in the dishwasher are accommodated.

Accordingly, the base 8 may support the entire dishwasher with its outer wall and the outer wall may define the space in which various mechanism are accommodated.

The dishwasher according to an embodiment may spray high-temperature wash water to the dishes accommodated in the tub 2 by heating the wash water introduced into the tub, thereby increasing washing efficiency for the dishes and performance of the dishwasher.

The dishwasher according to an embodiment may include a heat pump apparatus 10 configured to heat the wash water introduced into the tub 2. The heat pump apparatus 10 may heat the wash water so that the dishes can be washed by high-temperature wash water to improve the performance of the dishwasher.

In general, an electric heater heating wash water by converting an electric energy into heat may be used as a device for heating wash water. A coefficient of performance COP is a measure used to indicate the energy efficiency of the electric heater and the heat pump apparatus 10. The higher the coefficient of performance, the higher the energy efficiency of the device.

The performance coefficient of the electric heater is only 1 at the maximum. However, the dishwasher according to the embodiment may heat wash water by using the heat pump apparatus 10 instead of the electric heater. The heat pump apparatus 10 may move heat to a high-temperature thermal reservoir from a low-temperature thermal reservoir to make high-temperature heat, and heat the wash water by using the high-temperature heat.

Due to this structure, the heat pump apparatus 10 may have the coefficient of performance exceeding 1, and most of the coefficients of performance of the heat pump used actually may exceed 1. Accordingly, the dishwasher according to the embodiment that may heat wash water by using the heat pump apparatus 10 may have increased energy efficiency, compared to the conventional dishwasher heating wash water by using the electric heater.

Hereinafter, the heat pump apparatus according to an embodiment will be described in detail. FIG. 2 is a piping view schematically showing a heat pump apparatus according to an embodiment. In the drawings from FIG. 3, a flow direction of the refrigerant and wash water is illustrated as an arrow in a piping system and a flow direction of air is illustrated as a separate arrow.

The heat pump apparatus 10 may be mounted in the dishwasher to heat the wash water introduced into the tub 2. The heat pump apparatus 10 may include a compressor 100, a condenser 201, an expansion valve 300 and an evaporator 202.

The compressor 100, the condenser 201, the expansion valve 300 and the evaporator 202 may be connected via a piping system. A refrigerant may flow through the piping. The refrigerant may function as a working fluid that absorbs or dissipates heat by changing its phase from liquid to gas or conversely from gas to liquid, while sequentially circulating through the compressor 100, the condenser 201, the expansion valve 300 and the evaporator 202.

The compressor 100 may compress a refrigerant and discharge a high-temperature-high-pressure refrigerant. The condenser 201 may be provided with the refrigerant from the compressor 100 and heat the water introduced into the tub. Accordingly, the refrigerant may loss heat while flowing through the condenser 201 only to be condensed from gas to liquid. The refrigerant may be introduced into the expansion valve 300 from the condenser and the expansion valve may expand the refrigerant. The refrigerant may be expanded to be chilled while passing through the expansion valve 300.

The evaporator 202 may be provided with the refrigerant from the expansion valve 300 and may discharge the refrigerant to the compressor 100 to evaporate the refrigerant by absorbing heat from room-temperature air and the stored water. The refrigerant may be evaporated into gas by absorbing heat while passing through the evaporator 202.

The refrigerant may be introduced to the evaporator 202 from the expansion valve 300 and the evaporator 202 may evaporate the refrigerant by absorbing heat from air inside the tub 2. In other words, the refrigerant may flow inside the evaporator 202 and the evaporator 202 may evaporate the refrigerant by absorbing heat from air inside the tub.

The refrigerant may absorb or dissipate heat by changing its phase while circulating the compressor 100, the condenser 201, the expansion valve 300 and the evaporator 202. First, the refrigerant may be compressed to be a high-temperature-and-high-pressure refrigerant, while passing through the compressor 100.

The refrigerant may emit QH of heat while passing through the condenser 201. The heat emitted from the condenser 201 may be used in heating the wash water. Accordingly, flow paths through which the refrigerant and the wash water pass, respectively, may be provided in the condenser 201. The refrigerant may emit heat while passing through the condenser 201 and it may be condensed into liquid from gas. The refrigerant having passed through the condenser 201 may be a mixture of liquid and gas that has a very small gas ratio or may be a sub-cooled liquid.

The refrigerant discharged from the condenser 201 may be expanded while passing through the expansion valve 300. As a result of the expansion of the refrigerant, the temperature of the refrigerant may become lower and become a mixture gas of gas and liquid.

The refrigerant discharged from the expansion valve 300 may be evaporated by absorbing heat of QL1 from room-temperature air nearby, while passing through the evaporator 202 so that the gas ratio of the refrigerant may increase. At this time, the air of the tub 2 may be heated by the heated wash water or a heat pump to have somewhat high temperature air by the heated air introduced to the tub, compared to room temperature air nearby.

The refrigerant discharged from the evaporator 202 may be a mixed gas having a very small liquid ratio or a superheated gas.

The refrigerant discharged from the evaporator 202 may be introduced into the compressor 100 again and compressed to be high-temperature-and-high-pressure gas. As described above, the refrigerant may change its phase while circulating the heat pump apparatus 10 so that the refrigerant may absorb heat from the evaporator 202, and may emit heat from the condenser 201. The heat emitted from the condenser 201 may heat the wash water.

Accordingly, the heat pump apparatus 10 may absorb heat of QL from the air of the tub 2, which is a low-temperature heat reservoir, and emit heat to the wash water or air, which is a high-temperature heat reservoir, only to heat the wash water or air.

In order to actively transfer heat in the evaporator 202 it is appropriate to allow a large amount of air to flow toward the evaporator 202. For that, the heat pump apparatus 10 may include a blowing fan 620 for blowing air toward the evaporator 202.

The dishwasher may perform a washing mode configured to spray the heated wash water to the dishes stored in the tub 2, and a drying mode configured to remove moisture from surfaces of the dishes by spraying heated air to the dishes stored in the tub 2 after the washing mode.

In an embodiment, a plurality of heat exchangers may be provided. Each of the heat exchangers may be used or not used when the washing mode or the drying mode is performed. The heat exchangers may be operated as the condenser 201 or the evaporator 202, which will be described in detail below.

Figure 3:
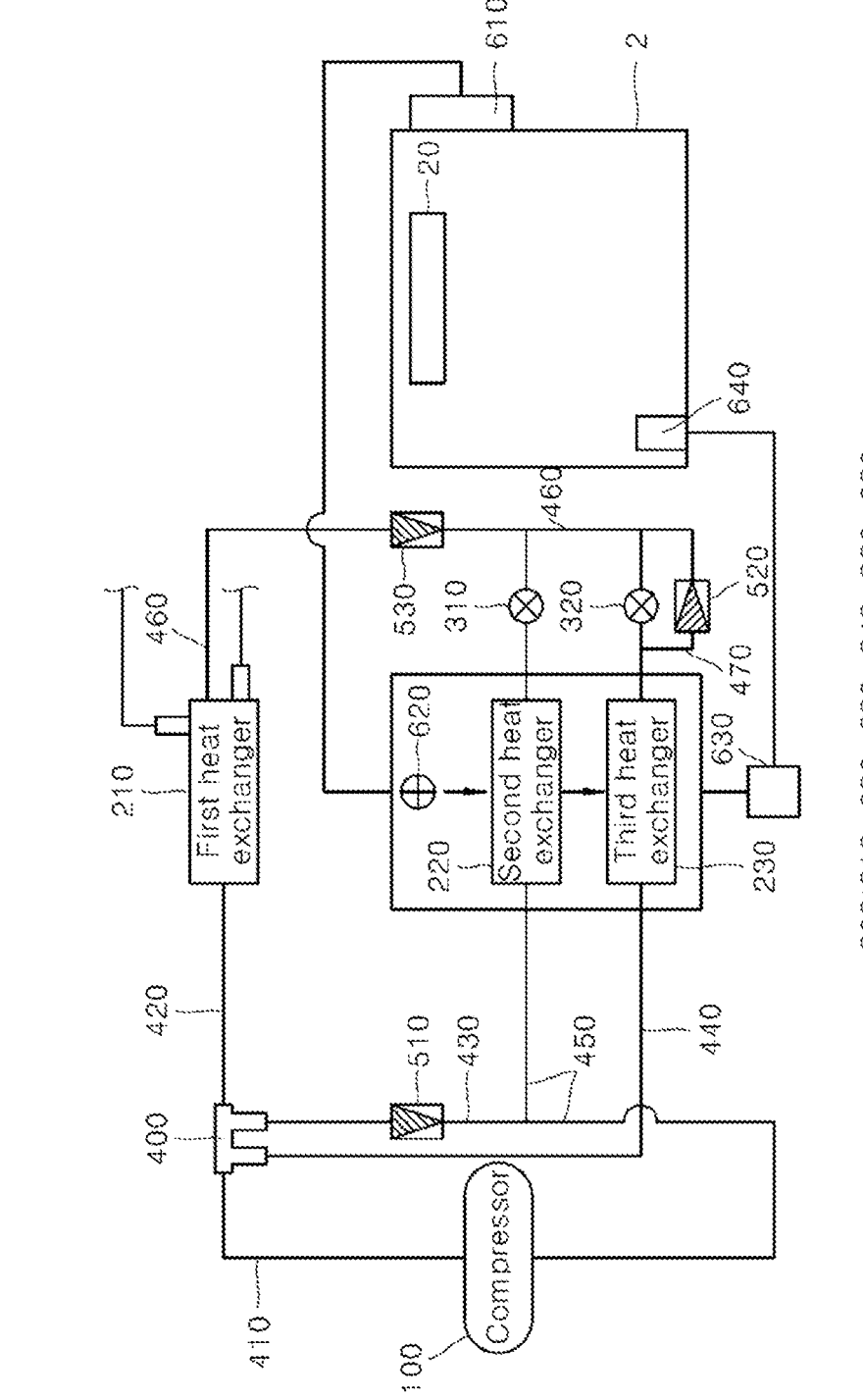
FIG. 3 is a piping view showing a heat pump apparatus according to an embodiment.

FIG. 3 is a piping view showing a heat pump apparatus according to an embodiment. The heat pump apparatus 10 may include a compressor 100, a first heat exchanger 210, a first expansion valve 310, a second heat exchanger 220, a second expansion valve 320, a third heat exchanger 230 and a four-way valve 400.

The compressor 100 is the same as what is described above. The first heat exchanger 210 may have the refrigerant introduced therein from the compressor 100 and heat the water introduced to the tub 2. The first heat exchanger 210 may be operated as the condenser 201 configured to heat the wash water and condenser the refrigerant by transferring heat to the wash water from the refrigerant. The first heat exchanger 210 may not be operated in the drying mode.

The first expansion valve 310 may have the refrigerant introduced from the first heat exchanger 210 and expand the refrigerant. The second heat exchanger 220 may have the refrigerant introduced from the first expansion valve 310. The second heat exchanger 220 may be operated as the evaporator 202 in both the washing mode and the drying mode.

The second expansion valve 320 may be disposed in parallel with the first expansion valve 310, and expand the refrigerant introduced therein from the first heat exchanger 210. When the dishwasher performs the washing mode, the second expansion valve 320 may be open. When the dishwasher performs the drying mode, the second expansion valve 320 may be closed.

The third heat exchanger 230 may be disposed in parallel with the second heat exchanger 220, and have the refrigerant introduced therein from the second expansion valve 320. The third heat exchanger 230 may be operated as the evaporator 202 in the washing mode and as the condenser 201 in the drying mode.

The four way valve 400 may be connected with the compressor 100, the first heat exchanger 210, the second heat exchanger 220 and the third heat exchanger 230, and may change a flowing path of the refrigerant. The four way valve 400 may make the flow path of the refrigerant different in each of the washing mode and the drying mode, so that it may be determined whether the first heat exchanger 210 to the third heat exchanger 230 are used or not used, or whether they are used as the condenser 201 or the evaporator 202.

The heat pump apparatus 10 may include a first pipe 410 connecting the four way valve 400 and the compressor 100 with each other; a second pipe 420 connecting the four way valve 400 and the first heat exchanger 210; a third pipe connecting the four way valve 400 and the second heat exchanger 220 with each other; a fourth pipe 440 connecting the four way valve 400 and the third heat exchanger 230 with each other; and a fifth pipe 450 connecting the second heat exchanger 220 and the compressor 100 with each other. Refrigerant may flow through each of the pipes.

At this time, the third pipe 430 may be connected with the fifth pipe 450. Accordingly, the refrigerant flowing through the third pipe 430 may be introduced to the compressor 100.

A first check valve 510 may be provided in the third pipe 430 to block the refrigerant from flowing to the four way valve from the fifth pipe 450. The check valve may allow the refrigerant to flow only in an arrow direction and not to flow the refrigerant in the direction opposite to the arrow direction by blocking.

The first check valve 510 may allow the refrigerant to flow toward the compressor 100 from the four way valve and suppress it from flowing toward the four way valve 400 from the second heat exchanger 220.

The heat pump apparatus 10 may include a blowing fan 620 disposed to face the second heat exchanger 220 and the third heat exchanger 230 and configured to blow air toward the second heat exchanger 220 and the third heat exchanger 230.

The blowing fan 620 may allow a large amount of air to flow toward the second heat exchanger 220 and the third heat exchanger 230 by blowing air toward them. Accordingly, the amount of heat transfer between the refrigerant flowing inside the second heat exchanger 220 and the third heat exchanger 230 and the air flowing outside the second heat exchanger 220 and the third heat exchanger 230 may be increased.

The blowing fan 620 may be disposed at a position facing the second heat exchanger 220. The second heat exchanger 220 may be positioned between the blowing fan 620 and the third heat exchanger 230. Due to this structure, the air forcibly blown by the blowing fan 620 may pass through the third heat exchanger 230 after passing through the second heat exchanger 220.

The heat pump apparatus 10 may include a bypass pipe 470 and a second check valve 520. The bypass pipe 470 may be connected to both sides of the second expansion valve 320. When the second expansion valve 320 is closed, the refrigerant may bypass the second expansion valve 320 through the bypass pipe 470.

The second check valve 520 may be disposed in the bypass pipe 470 and configured to block the refrigerant from flowing to an outlet from an inlet of the second expansion valve 320 through the bypass pipe 470.

In the washing mode, the second expansion valve may be open. At this time, the flow of the refrigerant to flow from the inlet to the outlet of the second expansion valve 320 through the bypass pipe 470 may be blocked by the second check valve 520.

In the drying model, the second expansion valve 320 may be closed. At this time, the refrigerant may flow from the outlet of the second expansion valve to the inlet through the bypass pipe 470 and may be blocked from flowing from the inlet of the second expansion valve 320 to the outlet by the second check valve 520.

The heat pump apparatus 10 may include a sixth pipe 460 and a third check valve 530. The sixth pipe 460 may have one side connected with the first heat exchanger 210 and the other side connected with the first expansion valve 310, the second expansion valve 320 and the bypass pipe 470.

The third check valve 530 may be disposed in the sixth pipe 460 and configured to block the refrigerant from flowing to the first heat exchanger 210 from at least one of the first expansion valve 310, the second expansion valve 320 and the bypass pipe 470.

In the drying mode, the first heat exchanger 210 may not be used. Accordingly, the third check valve 530 may be disposed in the sixth pipe 460 connected to the outlet to the first heat exchanger 210 so that the refrigerant may not flow in the first heat exchanger 210. Accordingly, the flow of the refrigerant to flow backward into the first heat exchanger 210 through the outlet of the first heat exchanger 210 may be blocked by the third check valve 530.

The dishwasher may include a sump 4 provided under the tub 2 to store wash water; and a spray arm 20 provided in the tub 2, while being connected with the sump 4, to spray wash water. The detailed structure of the sump 4 and the spray arm 20 is already described above.

In the washing mode, the heated wash water may be sprayed to the tub 2 through the spray arm. The wash water introduced from the tub 2 in the washing mode may be heated while passing through the first heat exchanger 210 and transferred to the tub 2 to be sprayed through the spray arm. At this time, the first heat exchanger 210 may be operated as the condenser 201 configured to heat the wash water by absorbing heat from the refrigerant.

Figure 4:
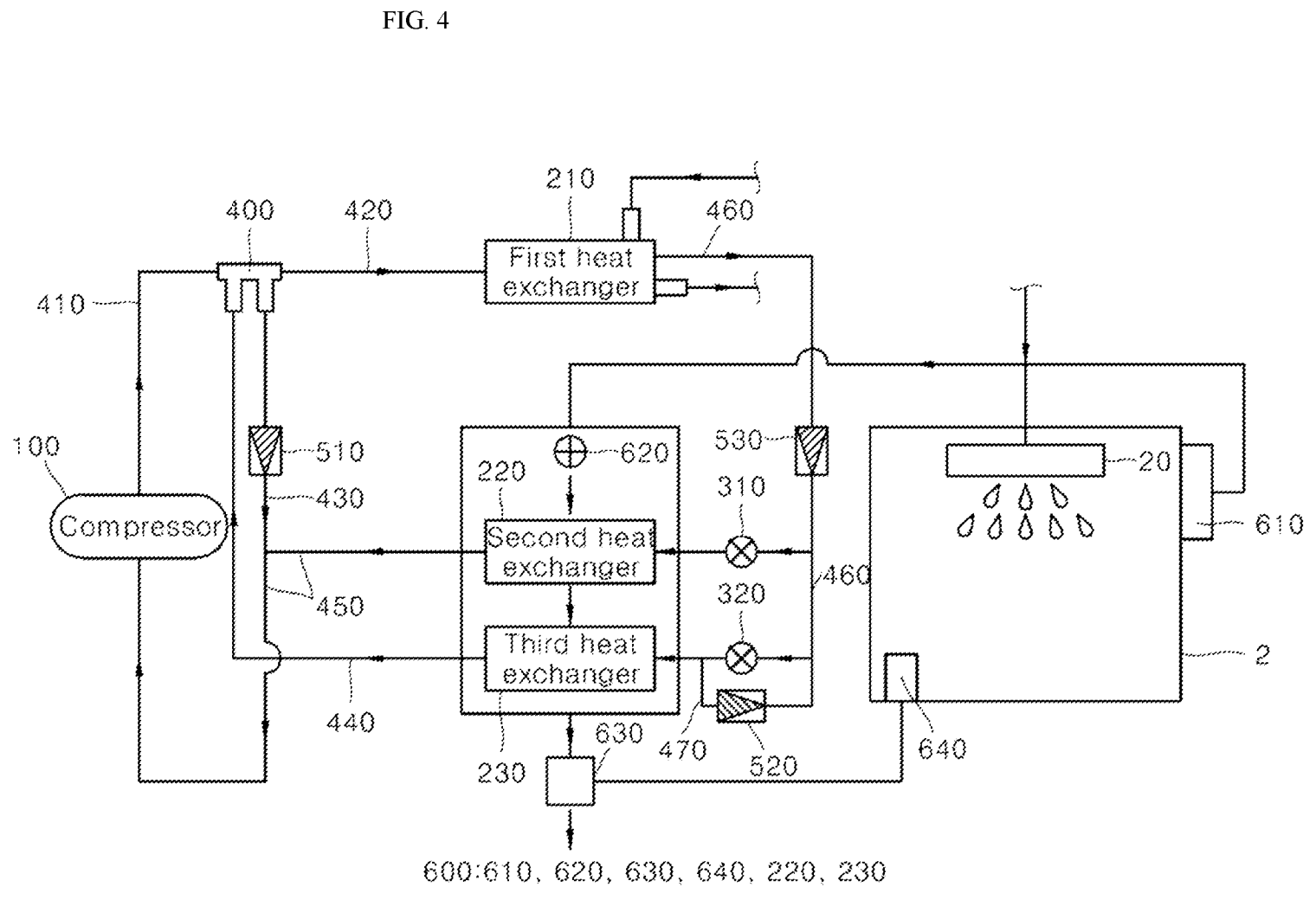

FIG. 4 is a piping view to describe an operation of a heat pump apparatus when heating wash water. The operation of the heat pump apparatus 10 when the dishwasher heats wash water in the washing mode will be described, referring to FIG. 4.

When the dishwasher performs the washing mode, the four way valve 400 may connect the first pipe 410 and the second pipe 420, and may connect the third pipe 430 and the fourth pipe 440. At this time, the first pipe 410 may not be connected with the third pipe 430 or the fourth pipe 440, and the second pipe 420 may not be connected with the third pipe 430 or the fourth pipe 440.

Accordingly, the first pipe 410 and the second pipe 420 may be separated from the third pipe 430 and the fourth pipe 440, and the third pipe 430 and the fourth pipe 440 may be also separated from the first pipe 410 and the second pipe 420.

When the dishwasher performs the washing mode, the refrigerant discharged from the compressor 100 may be introduced to the first heat exchanger 210 after passing through the first pipe 410 and the second pipe 420. The refrigerant discharged from the second heat exchanger 220 may be introduced into the compressor 100 after passing the fifth pipe 450. The refrigerant discharged from the third heat exchanger 230 may be introduced to the compressor 100 after sequentially passing through the fourth pipe 440, the third pipe 430 and the fifth pipe 450.

In FIG. 4, the flow path of the refrigerant in the washing mode may be indicated as an arrow. The refrigerant discharged from the compressor 100 may be introduced to the first heat exchanger 210 after sequentially passing through the first pipe 410, the four way valve 400 and the second pipe 420.

At this time, since the refrigerant introduced to the first heat exchanger 210 has a high temperature, it may be deprived of heat by the wash water flowing in the first heat exchanger 210 to be condensed. Accordingly, the first heat exchanger 210 may be operated as the condenser 201 configured to heat wash water.

The refrigerant discharged from the first heat exchanger 210 may be expanded to have a low temperature, while passing through the first expansion valve 310 and the second expansion valve 320, which are connected in parallel with each other. In the washing mode, the second expansion valve 320 may be open to allow the flow of the refrigerant and the bypass pipe 470 may be blocked from the flow of the refrigerant by the second check valve 520.

The refrigerant discharged from the first expansion valve 310 may be introduced to the compressor 100 after sequentially passing through the second heat exchanger 220, the third pipe 430 and the fifth pipe 450. Since the first check valve 510 is disposed in the third pipe 430, the refrigerant may be blocked from flowing in the four way valve through the third pipe 430 by the first check valve 510.

The refrigerant discharged from the second expansion valve 320 may be introduced to the compressor 100 after sequentially passing through the third heat exchanger 230, the fourth pipe 440, the four way valve 400, the third pipe 430 and the fifth pipe 450.

In the washing mode, low-temperature refrigerant, and air inside the tub 2, which is relatively high temperature, may flow inside the second heat exchanger 220 and the third heat exchanger 230. Accordingly, the refrigerant passing through the second heat exchanger 220 and the third heat exchanger 230 may take heat from the air of the tub 2 to be evaporated. The second heat exchanger 220 and the third heat exchanger 230 may be operated as the evaporator 202.

That is, when the dishwasher performs the washing mode, the first heat exchanger 210 may transfer heat to the wash water from the refrigerant to heat the wash water, and may be operated as the condenser 201 configured to condense the refrigerant. The second heat exchanger 220 and the third heat exchanger 230 may be operated as the evaporator 202 configured to evaporate refrigerant by transferring heat to the refrigerant from air.

Figure 5:
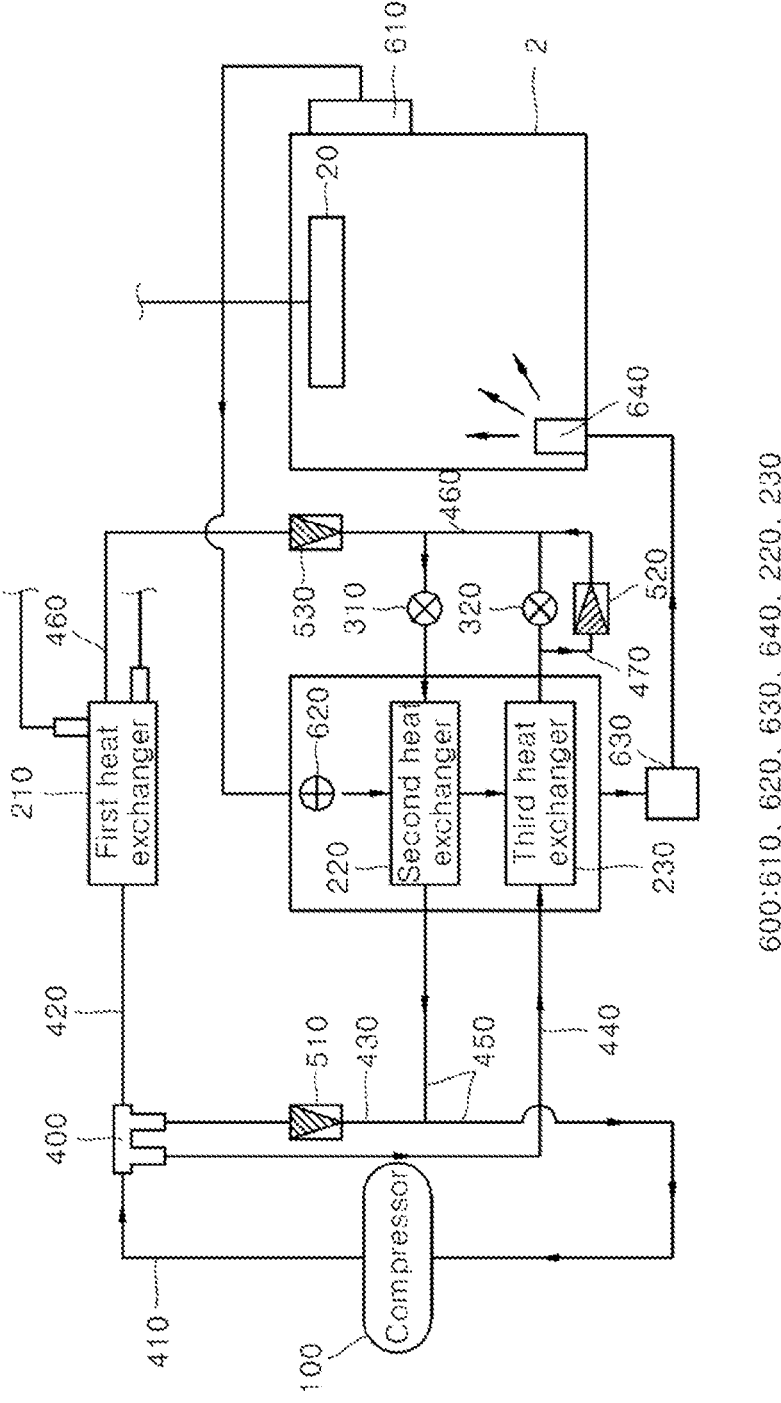
FIG. 5 is a piping view to describe an operation of a heat pump apparatus when heating air.

FIG. 5 is a piping view to describe an operation of a heat pump apparatus 10 when heating air. The operation of the heat pump apparatus 10 when the dishwasher performs the drying mode configured to dry the dishes stored in the tub by using heated air after the washing mode will be described, referring to FIG. 5. In FIG. 5, a flow path of the refrigerant in the drying mode is indicated as an arrow in a pipe.

In the drying mode, the flow of wash water may stop in the heat pump apparatus 10. Accordingly, in the drying mode, wash water may not be sprayed to the tub 2 but heated air may be sprayed to the tub by an air flow part 600 instead.

When the dishwasher performs the drying mode, the four way valve 400 may connect the first pipe 410 and the fourth pipe 440, and the second pipe 420 and the third pipe 430 may be separated from the first pipe 410 and the fourth pipe 440.

At this time, the first pipe 410 may not be connected with the second pipe 420 or the third pipe 430. The fourth pipe 440 may not be connected with the second pipe 420 or the third pipe 430. Here, the second pipe 420 and the third pipe 430 may be connected with each other.

When the dishwasher performs the drying mode, the refrigerant discharged from the compressor 100 may be introduced to the third heat exchanger 230 after passing through the first pipe 410 and the fourth pipe 440. The refrigerant discharged from the second heat exchanger 220 may be introduced to the compressor 100 after passing through the fifth pipe 450. The flow of the refrigerant into the first heat exchanger 210 may be blocked by the first check valve 510 and the third check valve 530.

Referring to FIG. 5, the structure will be described in detail. The refrigerant discharged from the compressor 100 may be introduced to the third heat exchanger 230 after sequentially passing through the first pipe 410, the four way valve 400 and the fourth pipe 440. The high temperature refrigerant passing through the third heat exchanger 230 may be deprived of heat by air to be condensed. Accordingly, the third heat exchanger 230 may be operated as the condenser 201 in the draying mode.

In the drying mode, the second expansion valve 320 may be closed. The opening and closing of the second expansion valve 320 may be performed by a controller provided in the dishwasher and configured to control the overall operation of the dishwasher.

After bypassing the closed second expansion valve 320 and passing through the bypass pipe 470, the second check valve 520 and the sixth pipe 460, the refrigerant may be introduced to the first expansion valve 310. The sixth pipe 460 may be connected with the first heat exchanger 210 but the third check valve 530 may be disposed in the sixth pipe 460 so that the flow of the refrigerant into the first heat exchanger 210 may be blocked by the third check valve 530.

The refrigerant may be a low temperature state while passing through the first expansion valve 310. The low temperature refrigerant may flow in the second heat exchanger 220 to be evaporated by taking heat from the relatively high temperature air flowing inside the second heat exchanger 220. In the drying mode, the second heat exchanger 220 may be operated as the evaporator 202.

The refrigerant discharged from the second heat exchanger 220 may flow into the compressor 200 after passing through the fifth pipe 450. The fifth pipe 450 may be connected with the third pipe 430 and the third pipe 430 may be connected with the four way valve 400. However, since the first check valve 510 is disposed in the third pipe 430, the flow of the refrigerant into the first heat exchanger 210 via the four way valve 400 may be blocked by the first check valve 510.

Accordingly, in the drying mode, the flow in the first heat exchanger 210 may be blocked by the first check valve 510 and the third check valve 530 and wash water may not flow, so that the first heat exchanger 210 may not be used as the evaporator 202 or other heat exchanger.

When the dishwasher performs the drying mode, the second heat exchanger 220 may be operated as the evaporator 202 to evaporate the refrigerant by transferring heat to the refrigerant from air. The third heat exchanger 230 may be operated as the condenser 201 to condense the refrigerant by transferring heat to air and heating the air In the washing mode, the heated wash water may be introduced to the tub 2, not air. Conversely, in the drying mode, the heated air may be introduced to the tub, not wash water.

The blowing fan 620 may blow the air flowing from the tub 2 toward the second heat exchanger 220 and the third heat exchanger 230. The blowing fan 620 may be operable in both the washing mode and the drying mode. Accordingly, it is necessary the air forcedly blown by the blowing fan 620 should not be introduced to the tub.

When the dishwasher performs the washing mode, the air having passed through the third heat exchanger 230 may be discharged outside the tub. When the dishwasher performs the drying mode, the air having passed through the third heat exchanger 230 may be introduced to the tub 2.

The air having passed through the third heat exchanger 230 after blown by the blowing fan 620 may pass through a damper device 630 and may be sprayed into the tub 2 through a second duct 640 provided in the tub 2.

As shown in FIG. 4 as an arrow, in the washing mode, the damper device 630 may be open to the outside of the dishwasher and the air blown by the blowing fan 620 may be discharged outside from the damper device 630. Accordingly, the air blown by the blowing fan 620 may be blocked from flowing in the tub 2.

In the drying mode, the damper device 630 may not be open to the outside and air may be sprayed into the tub 2 through the damper device 630 and the second duct 640.

In the embodiment, the heat pump apparatus 10 is used in selectively heating wash water or air so that energy efficiency of the dishwasher can be enhanced.

In the embodiment, the four way valve 400 may be used in changing the flow path of the refrigerant so that both the wash water and air supplied to the tub 2 can be heated. Accordingly, the entire volume of the heat pump apparatus 10 may be reduced and wash water or air can be effectively heated according to the operation mode of the dishwasher.

In the embodiment, when heating wash water that requires a relatively large amount of heat, the plurality of evaporators 202 may be used. When heating air that requires a relatively small amount of heat, one evaporator 202 may be used. Due to this structure, the number of evaporators 202 may be optimized based on the required amount of heat, thereby effectively reducing energy loss that might occur due to use of unnecessary devices.

Figure 6:
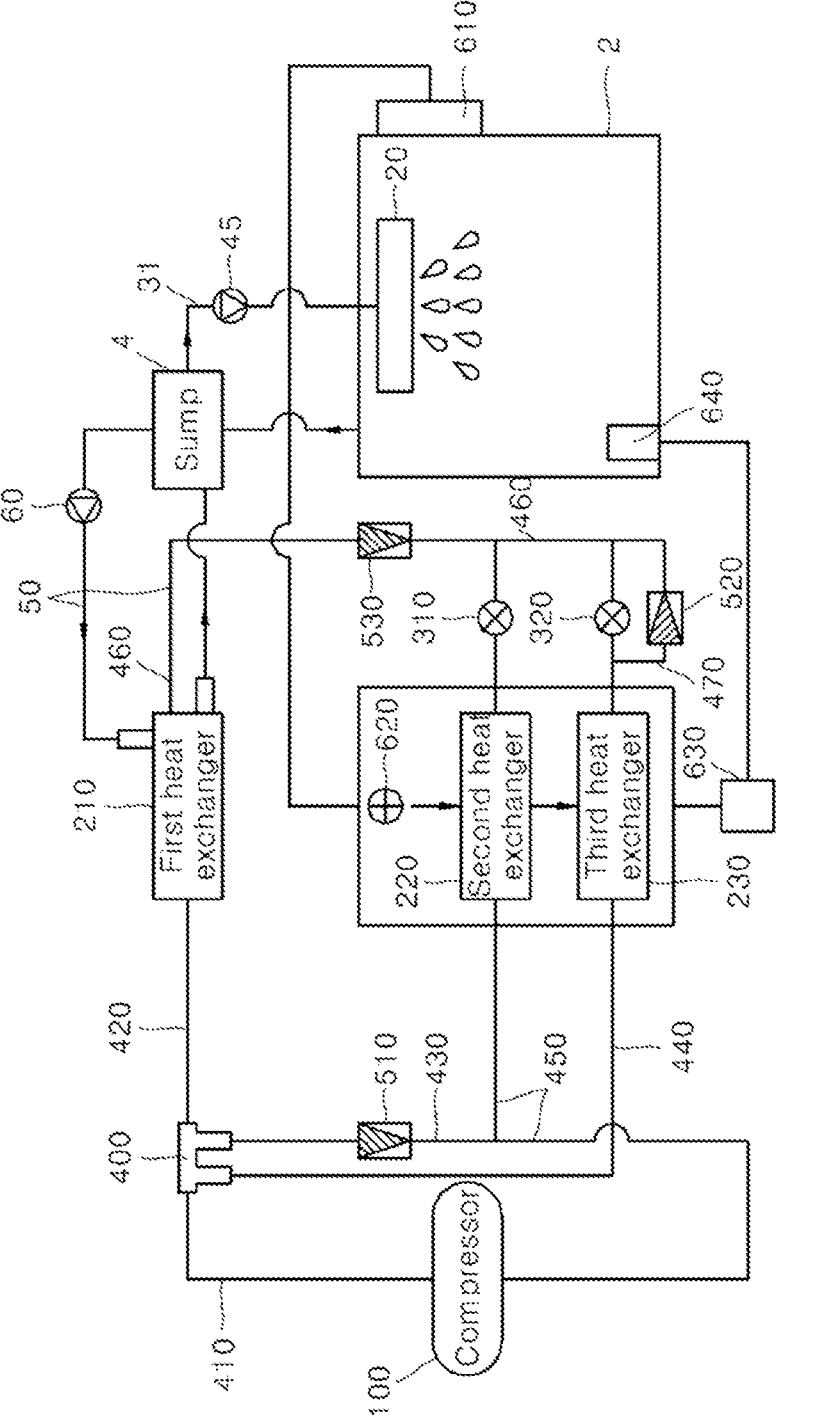
FIG. 6 is a piping view to describe a pipe connection structure between a heat pump apparatus according to an embodiment and a tub.

Hereinafter, the structure of heating wash water by using the heat pump apparatus 10 in the washing mode will be described in detail, referring to the accompanying drawing. FIG. 6 is a piping view to describe a pipe connection structure between a heat pump apparatus 10 according to an embodiment and a tub 2.

The dishwasher may include the sump 4 disposed under the tub 2 and storing wash water; and the spray arm provided in the tub 2, while being connected with the sump 4, and spraying wash water the detailed structure of the sump 4 and the spray arm is already described above The first heat exchanger 210 and the sump 4 may be connected through a pipe to circulate wash water therethrough. The dishwasher may include the first water supply path 31 and the water supply pump 45. The first water supply path 31 may be provided in the supply path 46.

The first water supply path 31 may connect the sump 4 and the spray arm and wash water may flow through the first water supply path 31. The water supply pump 45 may be disposed in the first water supply path 31 to supply wash water to the spray arm from the sump 4. The detailed structure of the water supply pump 45 is already described above.

The dishwasher may include the circulation path 50 and the circulation pump 60. The circulation path 50 may be provided in the supply path 46. The circulation path 50 may be connected with the first heat exchanger 210 and the sump 4, and wash water may circulate therethrough. The circulation path 50 may be connected with the first heat exchanger 210 and the wash water may be heated by absorbing heat from the refrigerant flowing in the first heat exchanger 210, while passing through the first heat exchanger 210 along the circulation path 50. The refrigerant may be deprived of heat by the wash water in the first heat exchanger 210 operated as the condenser 201 to be condensed.

The circulation pump 60 may be disposed in the circulation path 50 to circulate wash water between the first heat exchanger 210 and the sump 4. The wash water may be introduced to the first heat exchanger 210 by the circulation pump 60 to be heated. The heated wash water discharged from the first heat exchanger 210 may flow in the sump 4 through the circulation path 50. The heated wash water introduced to the sump 4 may be pumped by the water supply pump 45 and flow into the spray arm to be sprayed to the tub 2 through the spray arm.

The wash water may fall from the tub 2 and flow into the sump 4. The sump 4 may be disposed under the tub 2. Accordingly, the wash water may fall down under the tub 2 by the gravity to flow in the sump 4.

Some of the wash water introduced to the sump 4 may flow between the first heat exchanger 210 and the sump 4, and the other may flow between the sump 4 and the tub 2. At this time, the water supply pump 45 and the circulation pump 60 may be operated simultaneously. The heated wash water and the cold wash water falling from the tub 2 may be continuously mixed by the first heat exchanger 210. Accordingly, the wash water sprayed to the tub 2 through the spray arm after flowing in the spray arm from the sump 4 may be heated.

Figure 7:
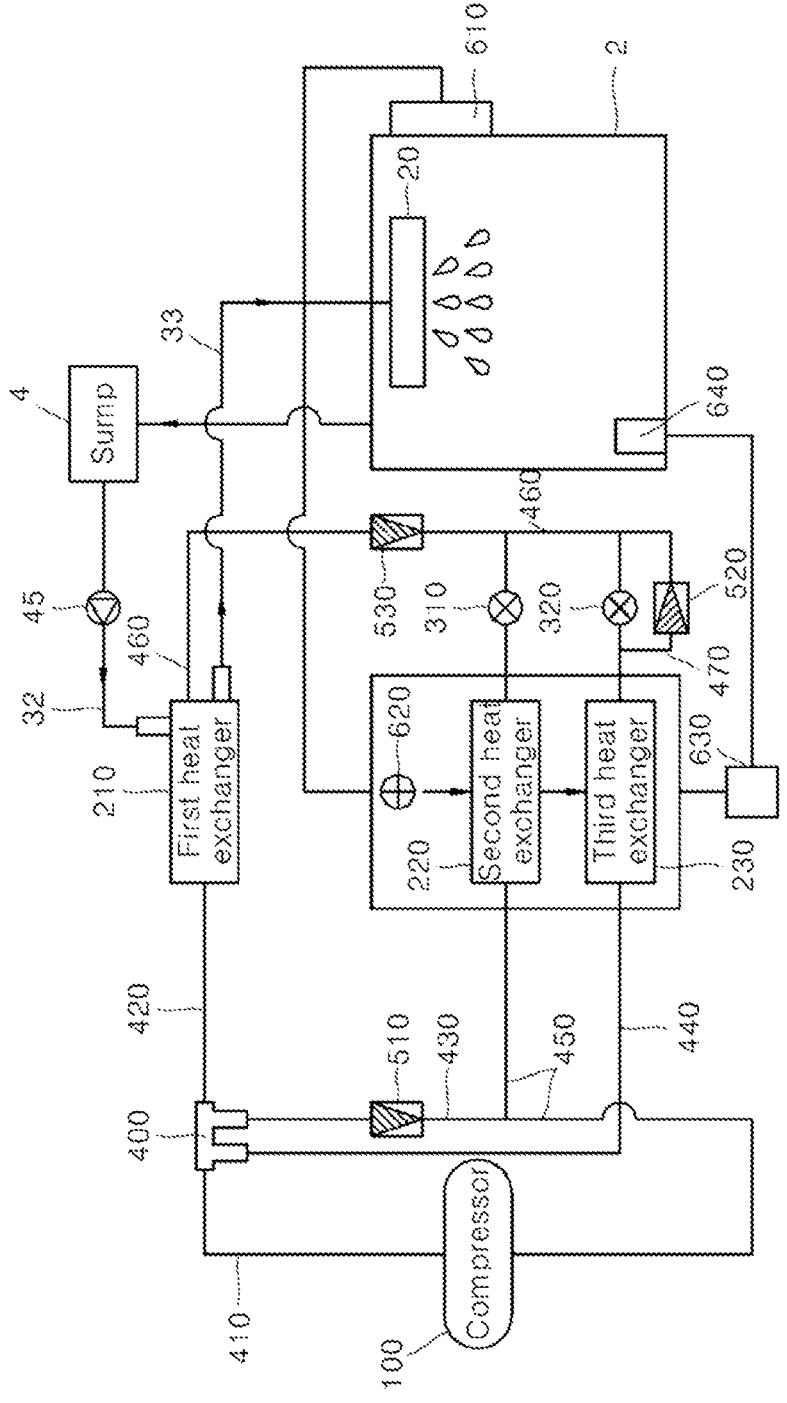
FIG. 7 is a piping view to describe a connection structure between a heat pump apparatus according to another embodiment and a tub.

FIG. 7 is a piping view to describe a connection structure between a heat pump apparatus 10 according to another embodiment and a tub 2. Hereinafter, repeated description compared to what is described above will be omitted.

In the dishwasher according to another embodiment, after falling down from the tub 2 and flowing into the sump 4, wash water may sequentially pass through the first heat exchanger 210 and the spray arm to be sprayed to the tub 2. That is, the wash water flowing into the sump 4 may be introduced to the spray arm after passing through the first heat exchanger 210.

The dishwasher according to the embodiment shown in FIG. 7 may include a second water supply path 32, a water supply pump 45 and a third water supply path 33. The second water supply path 32 and the third water supply path 33 may be provided in the supply path 46. The second water supply path 32 may be configured to connect the sump 4 and the first heat exchanger 210 with each other.

The water supply pump 45 may be disposed in the second water supply path 32 to supply wash water to the spray arm. The water supply pump 45 may be equal to what is described above, except that it is disposed in the second water supply path 32. The third water supply path 33 may connect the first heat exchanger 210 and the spray arm with each other.

The wash water introduced to the first heat exchanger 210 through the second water supply path 32 may be heated while passing through the first heat exchanger 210. The heated wash water discharged from the first heat exchanger 210 may flow along the third water supply path 33 to be introduced to the spray arm and sprayed to the tub.

In the embodiment shown in FIG. 7, the tub, the sump 4, the water supply pump 45 and the first heat exchanger 210 may constitute one circulation flow system. Accordingly, the wash water may be heated while passing through the first heat exchanger 210 and the heated wash water may be introduced to the spray arm, only with the existing water supply pump 45 without the need to add a separate pump.

Figure 8:
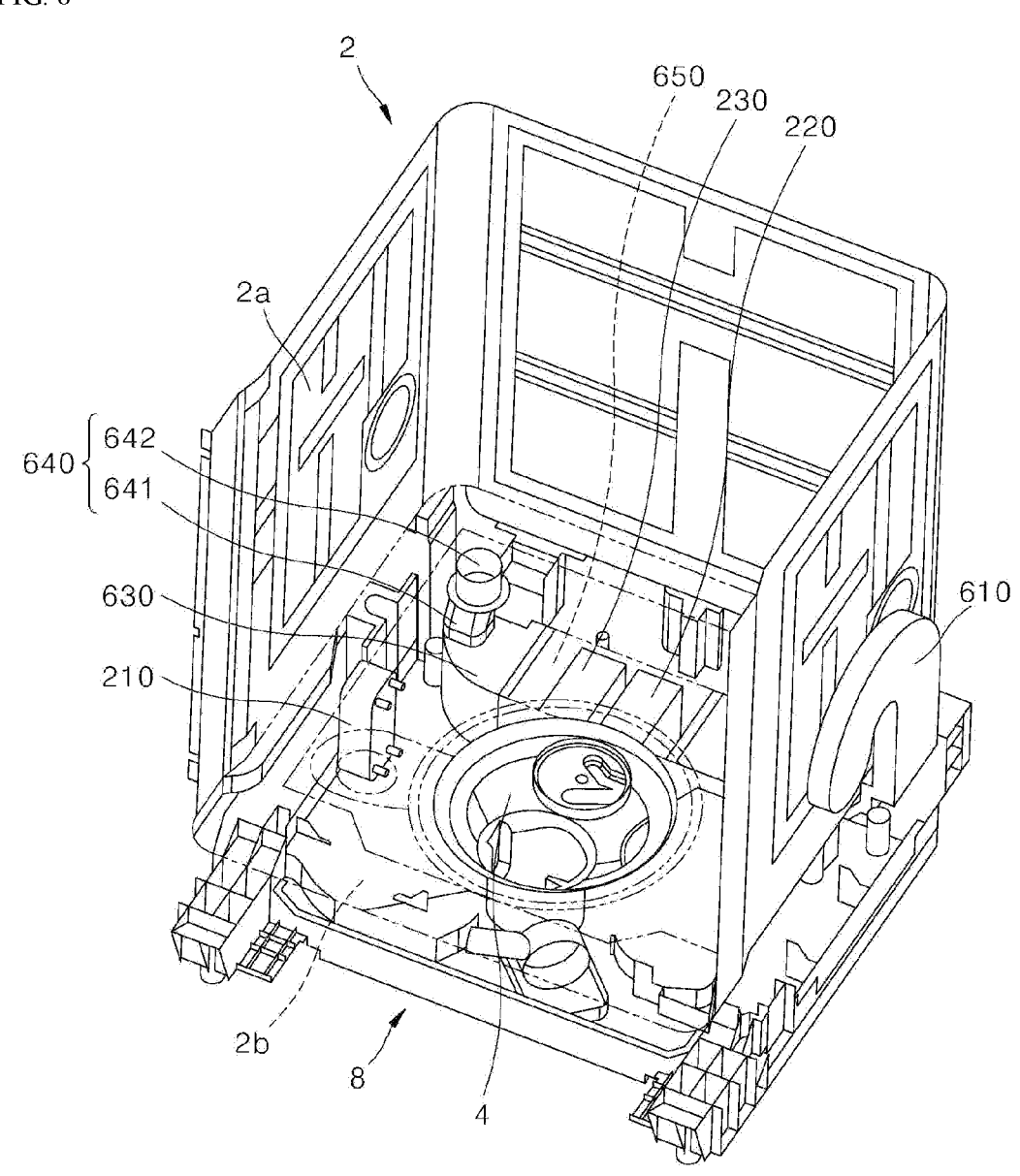
FIG. 8 is a perspective view partially showing a dishwasher according to an embodiment.
Figure 9:
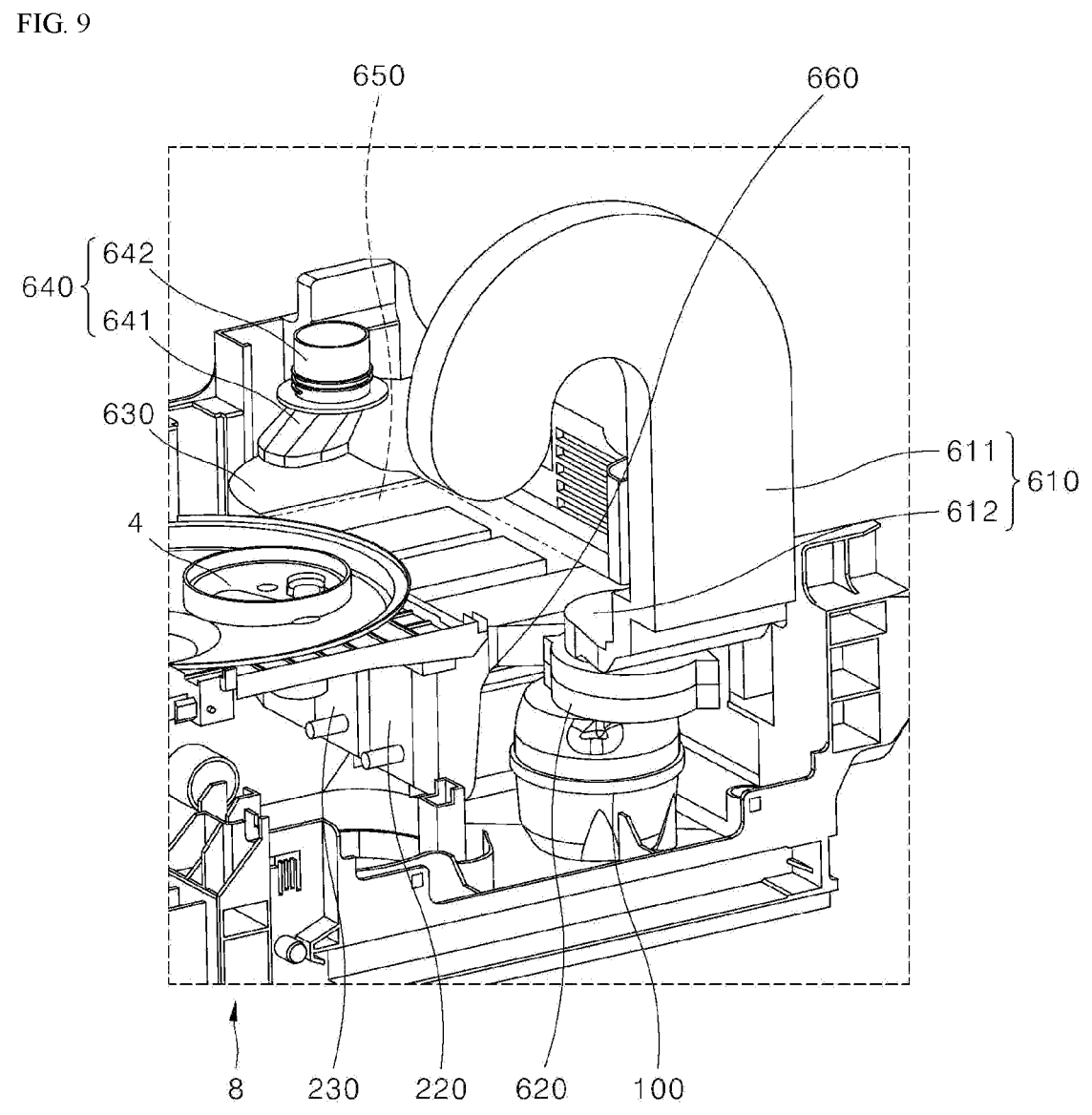

FIG. 8 is a perspective view partially showing a dishwasher according to an embodiment. FIG. 9 is a view showing an area of a dishwasher in which an air flow part 600 is disposed. For clear description, FIG. 8 illustrates that a bottom plate 2b of the tub is transparent to make visible the inside of the base 8 provided under the bottom plate 2b.

Hereinafter, referring to the drawings, the structure of the heat pump apparatus 10 will be described in detail.

The dishwasher may include the base 8 provided under the tub and supporting the tub 2. The tub 2 may include a lateral wall 2a surrounding an internal space at both sides and a rear side; and a bottom plate 2b integrally formed with the lateral wall 2a as one body. The base 8 and the tub 2 may be partitioned off by the bottom plate 2b. The bottom plate 2b may be partially recessed and some area of the sump 4 may be disposed in the recessed portion.

The inside of the base 8 may be provided as some space except for a support structure. Accordingly, various components of the dishwasher may be disposed in the inner space of the base 8. For example, the sump 4 may be disposed in the base 8. Some of the compressor 100, the blowing fan 620, the first heat exchanger 210, the second heat exchanger 220, the third heat exchanger 230 and the air flow part 600 may be disposed in the base 8.

In an embodiment, the first heat exchanger 210 disposed in the base 8 may be a plate heat exchanger. The space capable of accommodating the first heat exchanger 210 may be limited in the base 8. Accordingly, if the condenser is fabricated as a tube type heat exchanger, the volume of the condenser could become so large due to a considerably long tube that it could be difficult to dispose the condenser in the base 8.

Conversely, a plate heat exchanger may increase heat exchange efficiency between two working fluids (here, wash water and refrigerant). Compared with the tube type heat exchanger, the plat heat exchanger may have the same heat exchange efficiency with the tub heat exchanger, even with a smaller volume.

Accordingly, in the embodiment, the entire volume may be reduced by manufacturing the first heat exchanger 210 as the plate heat exchanger that can be easily mounted in the base 8. Due to this structure, space efficiency of the dishwasher can be improved.

In addition, the plate heat exchanger may control the heat exchange capacity by changing a distance between plates. By constituting the first heat exchanger 210 as the plate heat exchanger, it may be possible to effectively respond to changes in the heat exchange capacity required for the first heat exchanger 210.

Figure 10:
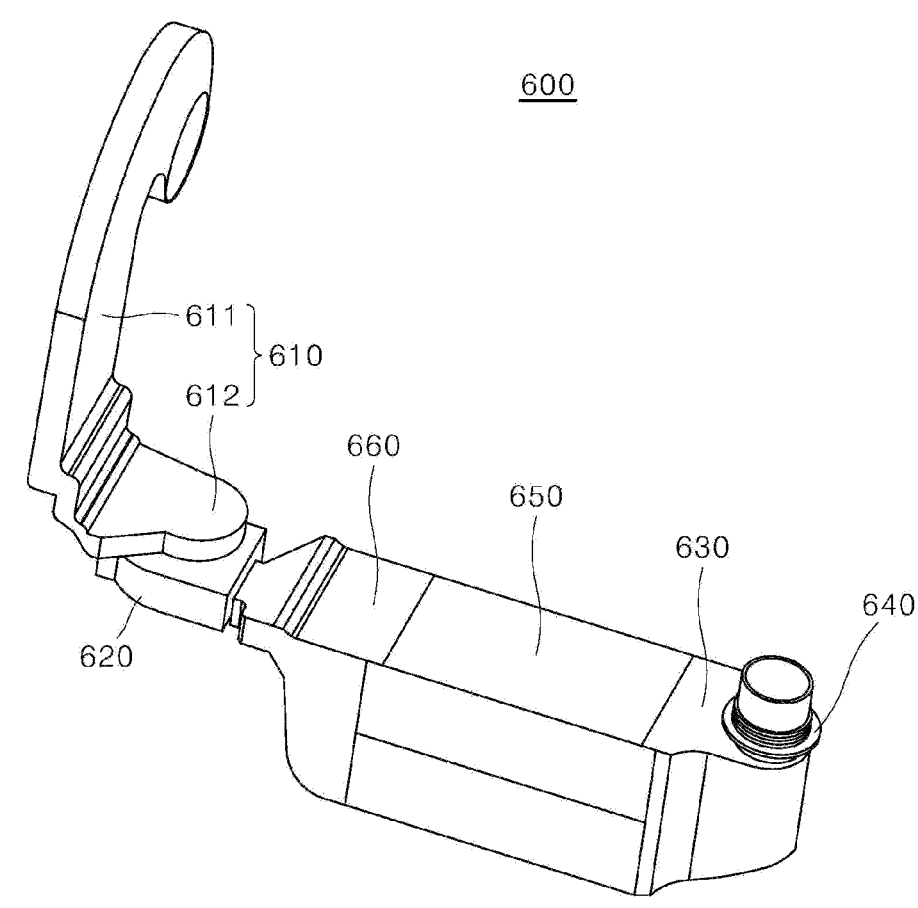
FIG. 10 is a perspective view of an air flow part according to an embodiment.
Figure 11:
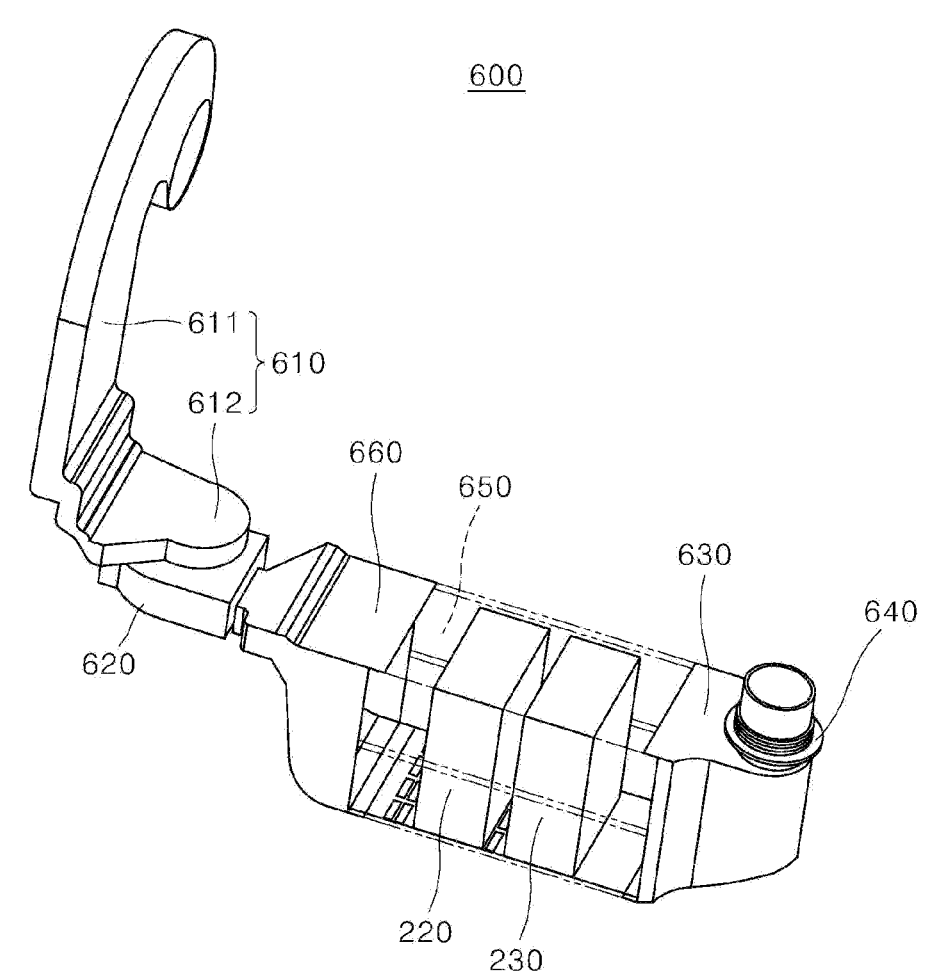
FIG. 11 is a view transparently showing some components of FIG. 10.

FIG. 10 is a perspective view of an air flow part 600 according to an embodiment. FIG. 11 is a view transparently showing some components of FIG. 10.

The heat pump apparatus 10 may include an air flow part 600. The air flow part 600 may be configured forcibly blow air inside the tub and heat the forcibly flowing air, in the drying mode. The air flow part 600 may include a first duct 610, a blowing fan 620, a second heat exchanger 220, a third heat exchanger 230, a damper device 630, a second duct 640, a cover 650 and a guide portion 660.

The first duct 610 may have an inlet connected with the tub 2 so that air inside the tub 2 may be introduced to the air flow part 600. The first duct 610 may be connected with the blowing fan 620 so that the air inside the tub 2 may be introduced to the air flow part 600 through the first duct 610 by the blowing fan 620.

The first duct 610 may include a first cell 611 and a second cell 612. The first cell 611 and the second cell 612 may be integrally formed with each other. The first cell 611 may be disposed outside the tub 2 to face the lateral wall 2a of the tub 2, in communication with the inside of the tub 2. A communication hole may be formed at a contact area between the first cell 611 and the lateral wall 2a of the tub 2.

The first cell 611 may extend in a vertical direction of the dishwasher, in contact with the outside of the lateral wall 2a. The first cell 611 may be disposed in an upper portion of the base, outside the tub 2.

The second cell 612 may have one end in communication with the first cell and the other end in communication with the blowing fan 620, with at least predetermined area disposed in the base 8. The second cell 612 may be bent and extended from one end of the first cell 611 to become in communication with the blowing fan 620.

The blowing fan 620 may be connected with the first duct 610 and configured to forcibly blow air to the air flow part 600. One end of the blowing fan 620 may be connected with the second cell 612 and the other structure of the blowing fan 620 is already described above.

The second heat exchanger 220 may be disposed to face the blowing fan 620 and may have refrigerant introduced therein from the first expansion valve 310. The detailed description of the second heat exchanger 220 is already made above. The third heat exchanger 230 may be disposed to face the second heat exchanger 220 and may have the refrigerant introduced therein from the second expansion valve 320. The detailed description of the third heat exchanger 230 is already made above.

For example, the second heat exchanger 220 and the third heat exchanger 230 may be provided as tube heat exchangers. Accordingly, the second heat exchanger 220 and the third heat exchanger 230 may be provided with a coupling pipe so that a pipe in which the refrigerant flows may be coupled to the coupling pipe. The coupling pipe may protrude to the outside of the second heat exchanger 220 and the third heat exchanger 230 or it may be a part of a tube.

The blowing fan 620 may be disposed to face the second heat exchanger 220. The second heat exchanger 220 may be disposed between the blowing fan 620 and the third heat exchanger 230. Due to this structure, the air forcibly blown by the blowing fan 620 may sequentially pass through the blowing fan 620, the second heat exchanger 220 and the third heat exchanger 230.

The damper device 630 may be connected with the third heat exchanger 230 and configured to change the flow path. The damper device 630 will be described in detail below, referring to the accompanying drawings.

The second duct 640 may have an outlet connected with the tub 2 and an inlet connected with the damper device 630. In the drying mode, the air having passed through the damper device 630 may be introduced to the tub 2 via the second duct 640.

The second duct 640 may include a first part 641 and a second part 642. The first part 641 and the second part 642 may be integrally formed with each other. The first part 641 may have one end in communication with the damper device 630. The second part 642 may be in communication with the first part 641 and protrude to the inside of the tub 2 by penetrating the bottom plate 2b of the tub 2 to communicate with the inside of the tub 2.

The forcedly blowing air may pass through the second part 642 and be introduced to the tub 2. In the washing mode, it is necessary to suppress the wash water from flowing into the air flow part through an opening of the second part 642. Accordingly, a cap may be coupled to one end of the second part 642 to suppress the flow of wash water into the air flow part 600.

The cover 650 may have one side connected with the damper device 630 and the other side connected with the guide portion 660. An inner space may be formed in the cover 650. The second heat exchanger 220 and the third heat exchanger 230 may be accommodated in the inner space. In addition, the cover 650 may provide a flow space through which the forcedly flowing air passes while contacting a surface of the second heat exchanger 220 and a surface of the third heat exchanger 230.

The guide portion 660 may have one side connected with the blowing fan 620 and the other side connected with the cover 650. The guide portion 660 may guide the flow of air passing through the second heat exchanger 220 and the third heat exchanger 230 after discharged from the flowing fan 620.

Figure 12:
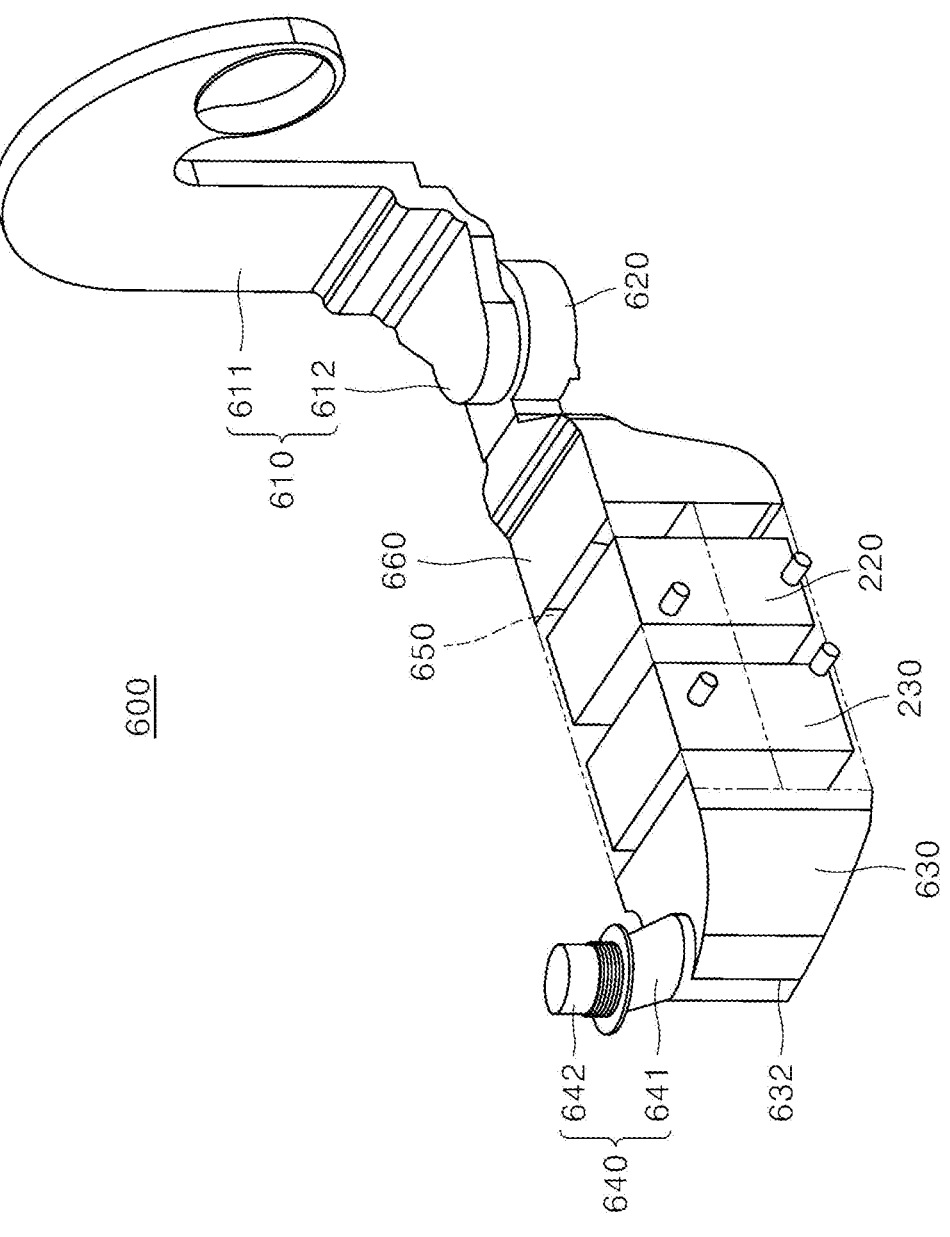
FIG. 12 is a view of FIG. 11 from a different direction.
Figure 13:
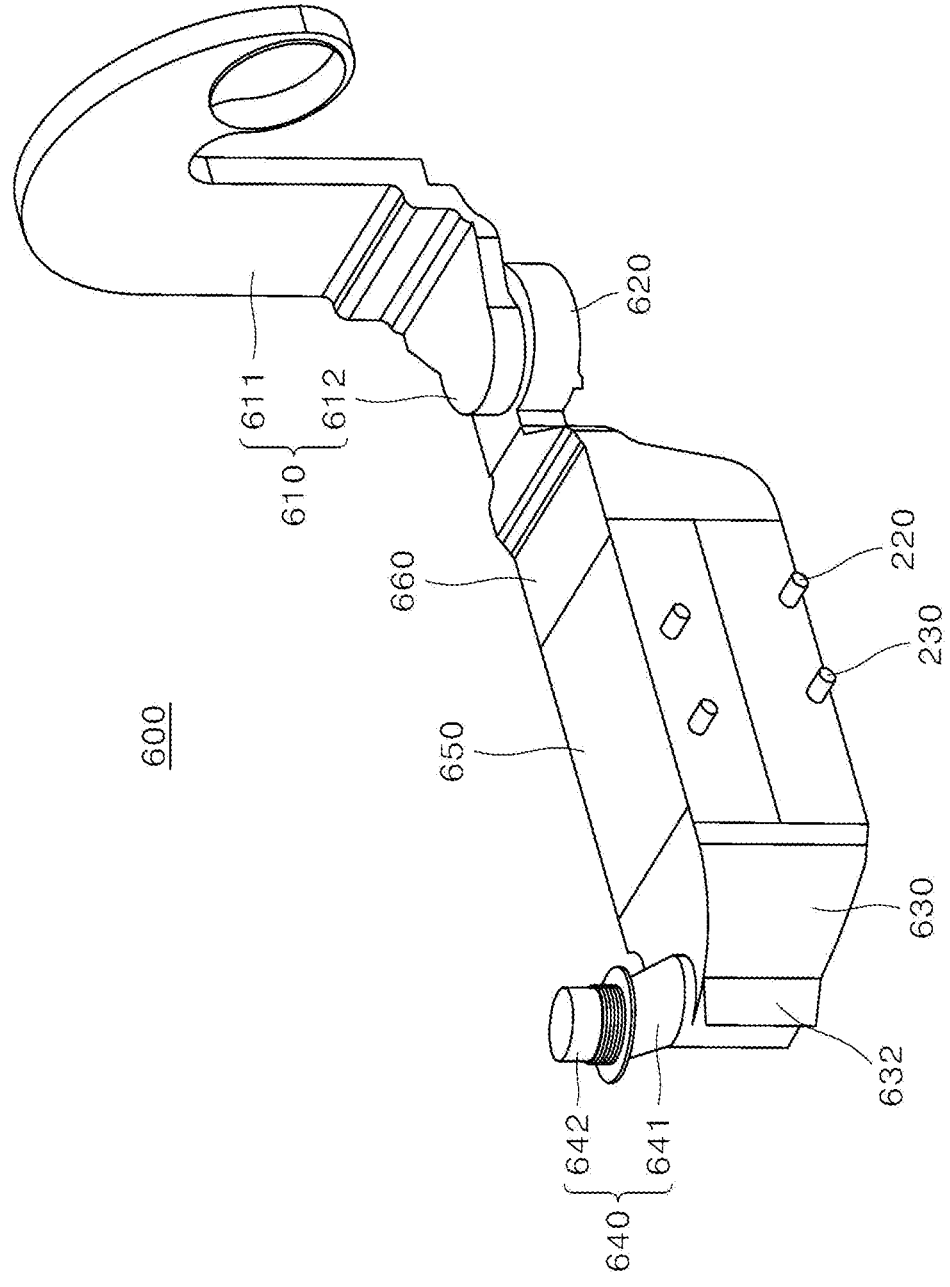
FIG. 13 is a view showing a state where a first damper of FIG. 12 is open.

FIG. 12 is a view of FIG. 11 from a different direction. FIG. 13 is a view showing a state where a first damper 632 of FIG. 12 is open.

In the washing mode, wash water may be sprayed to the tub 2. In the drying mode, air may be sprayed to the tub 2. The blowing fan 620 disposed in the air flow part 600 may be operated in both the washing mode and the drying mode.

This it because air has to supply heat to the evaporator 202 in both the washing mode and the drying mode and thus the blowing fan 620 has to be operated in both the washing mode and the drying mode to forcibly blow air.

The air blown by the blowing fan 620 may circulate air inside the air flow part 600 and the tub 2. In the drying mode, the circulation of air may increase the flow of air inside the tub, thereby increasing drying efficiency.

However, there is no need to circulate air in the washing mode. In the washing mode, when air is introduced to the tub 2 from the air flow part 600, the temperature of the tub 2 and the temperature of the wash water sprayed to the tub 2 could become lower.

In other words, both the second heat exchanger 220 and the third heat exchanger 230, through which the forcibly flowing air passes, may be operated as the evaporators 202. Accordingly, the air passing through the second heat exchanger 220 and the third heat exchanger 230 could loss heat to the refrigerant to have the low temperature.

When air is circulated in the washing mode, the air cooled to be a low temperature state while passing through the second heat exchanger 220 and the third heat exchanger 230 may be introduced to the tub 2 to lower the temperature of the tub. Accordingly, the temperature of the wash water might be lowered together, thereby reducing washing efficiency.

Therefore, in the washing mode, it is necessary to discharge the air forcibly blown by the blowing fan 620 outside the dishwasher, not flowing into the tub again.

In case the dishwasher performs the washing mode, the heat pump apparatus 10 according to an embodiment may heat the wash water supplied to the tub 2 and discharge the air forcibly flowing therein to the outside of the tub 2. When the dishwasher performs the drying mode, the heat pump apparatus 10 may heat the air supplied to the tub 2 and introduce the air forcibly flowing inside the heat pump apparatus 10 to the tub 2.

The structure of the heat pump apparatus 10 configured to heat and spray wash water to the tub 2 in the washing mode is already described above. Hereinafter, air flow in the washing mode and the drying mode will be described.

The air flow part 600 may include the damper device 630. The damper device 630 may change flow path of air. In the washing mode, the forcibly flowing air may be discharged to the outside of the tub 2, not flowing into the tub 2, by the operation of the damper device 630. In the drying mode, the forcibly flowing air may not be discharged to the outside of the tub 2 but flow into the tub 2, by the operation of the damper device 630. The damper device 630 may include a first discharge hole 631, a first damper 632 and a second damper 633.

The damper device 630 may be provided in the air flow part 600 and disposed in the base 8 together with some area of the air flow part 600. The first discharge hole 631 may discharge the air introduced to the damper device 630 to the outside of the duct. The first discharge hole 631 may be open toward the outside from the damper device 630. Accordingly, the air discharged from the first discharge hole 631 may be discharged to the outside of the dishwasher through the base 8.

The first damper 632 may be configured to selectively open and close the first discharge hole 631. The first damper 632 may be coupled to a body of the damper device 630 by a hinge mechanism. Accordingly, the first damper 632 may be hingedly rotated to selectively open and close the first discharge hole 631. The hinge rotation of the first damper 632 may be controlled by a controller.

The second damper 633 may be configured to selectively open and close the inlet of the second duct 640. The second duct will be described below, referring to FIGS. 16 and 17.

In the washing mode, the first discharge hole 631 may be open and the inlet of the second duct 640 may be closed. Accordingly, in the washing mode, the air forcibly flowing in the air flow part 600 may not be introduced to the tub but discharged to the outside through the first discharge hole 631.

Conversely, in the drying mode, the first discharge hole 631 may be closed and the inlet of the second duct 640 may be open. Accordingly, in the drying mode, the air forcibly flowing in the air flow part 600 may pass through the second duct 640 and flow into the tub 2.

Figure 14:
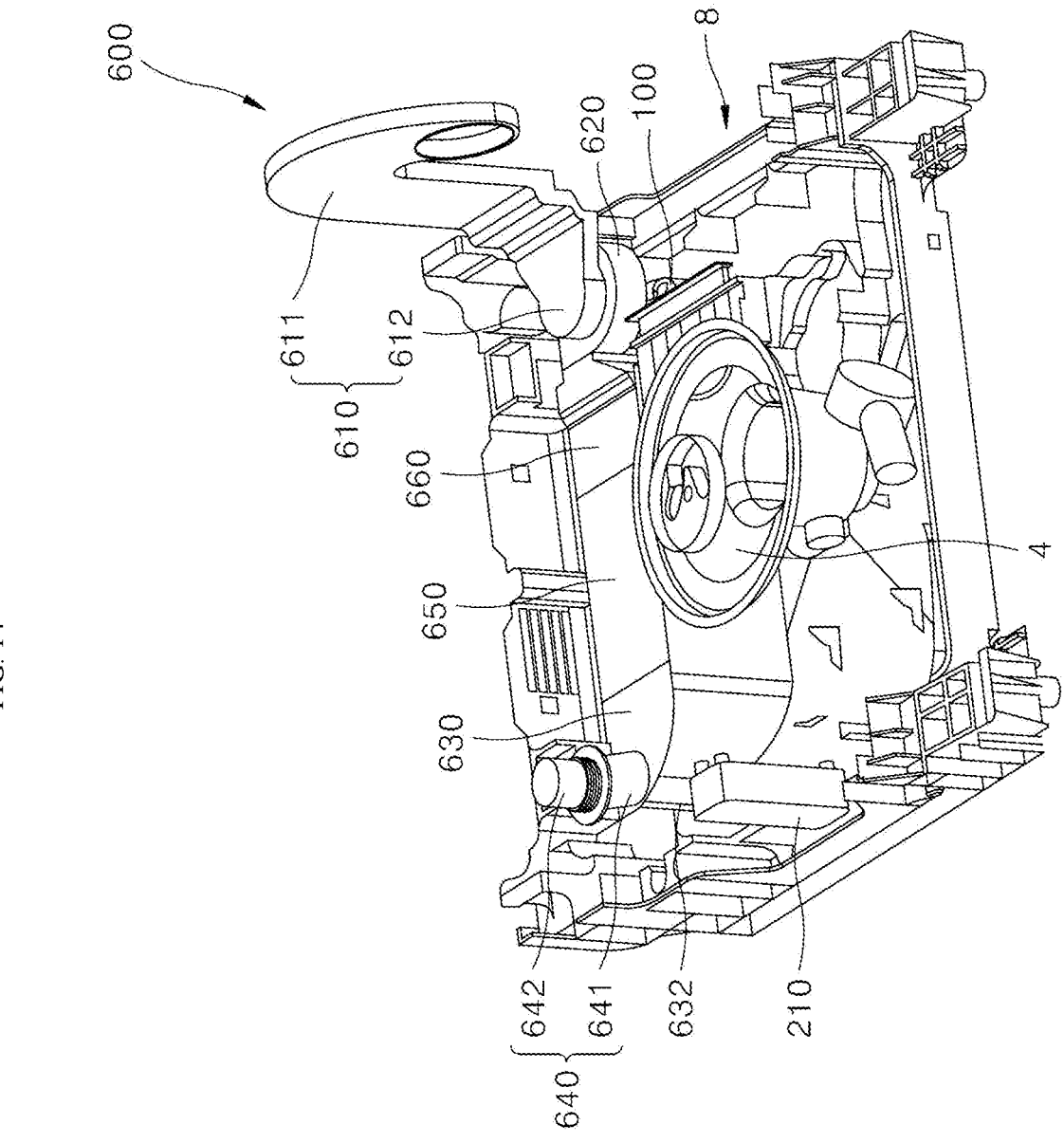
FIG. 14 is a perspective view showing a state where an air flow part is mounted in a base.
Figure 15:
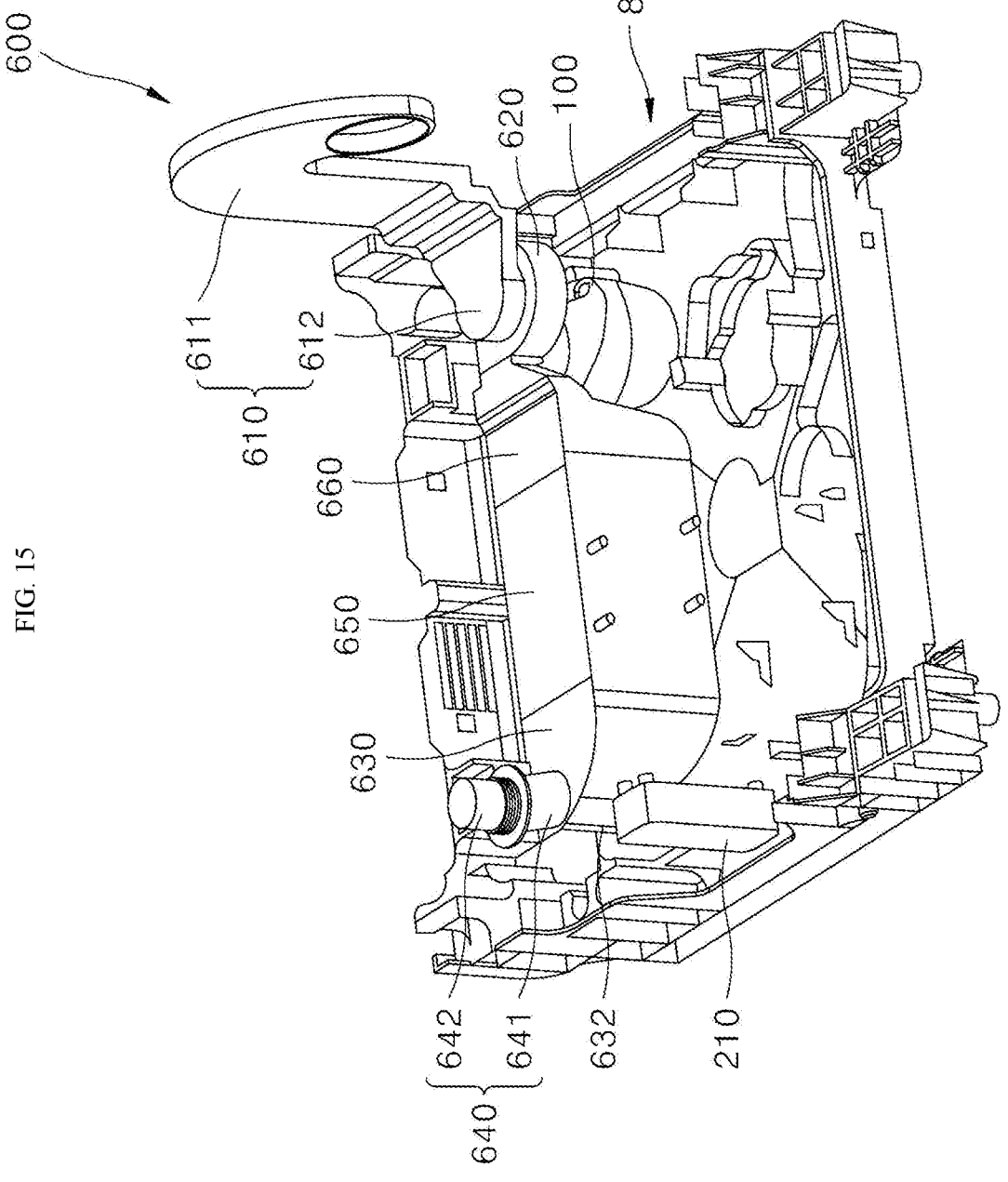
FIG. 15 is a view in which a sump is omitted in FIG. 14.

FIG. 14 is a perspective view showing a state where an air flow part 600 is mounted in a base 8. FIG. 15 is a view in which a sump 4 is omitted in FIG. 14.

The sump 4 may be disposed in a predetermined area of the base 8 and it may be provided at a position avoiding the positions at which the blowing fan 620, the second heat exchanger 220, the third heat exchanger 230 and the damper device 630 are disposed, respectively.

In the sump 4, wash water has to smoothly flow in the washing process so that it is appropriate to disposed the sump 4 at a position spaced apart from the positions of the blowing fan 620, the second heat exchanger 220, the third heat exchanger 230 and the damper device 630, which could become obstacles hindering the flow of wash water in the sump 4. With the same reason, it is also appropriate to dispose the sump 4 at a position spaced apart from the positions of the first heat exchanger 210 and the compressor 100.

Similarly, the cover 650 accommodating the second heat exchanger 220 and the third heat exchanger 230, and the guide portion 660 having both ends connected with the cover and the blowing fan 620, respectively, may be disposed at positions that are spaced apart from the position of the sump 4. Meanwhile, the first cell 611 connected with the tub 2 in the first duct 610 may be disposed on one side of the tub 2 and at least predetermined area of the second cell 612 connected with the blowing fan 620 may be disposed at position that avoids the position of the sump 4 in the base 8.

Figure 16:
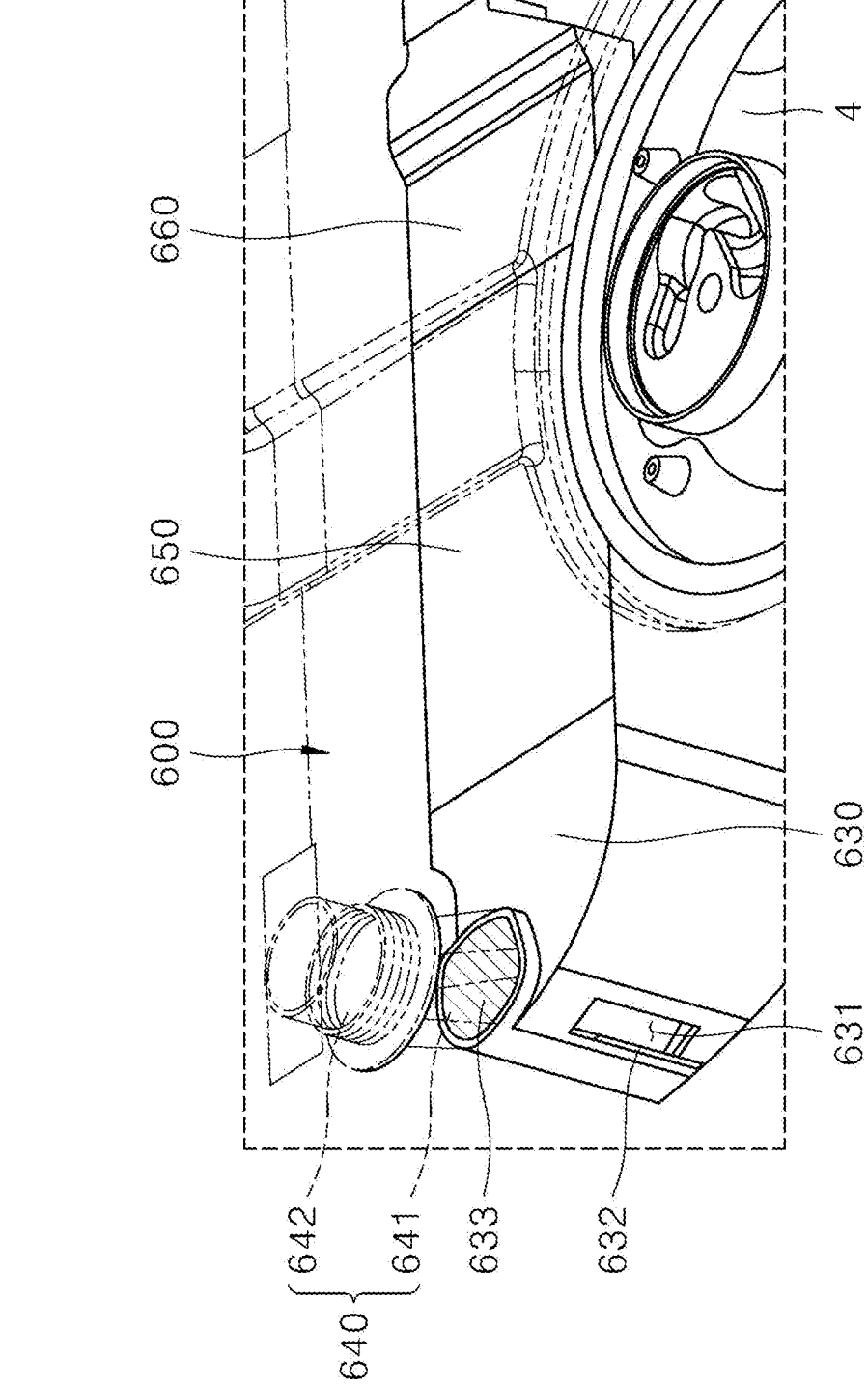
FIG. 16 is a partial view showing a state where a second damper is closed.
Figure 17:
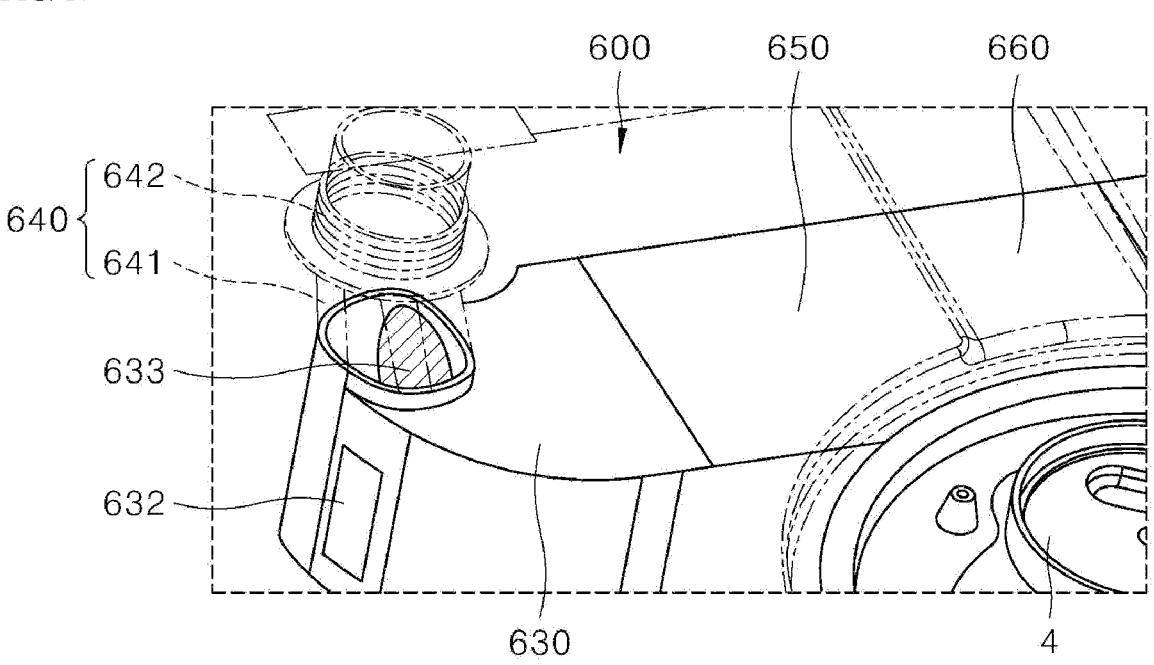
FIG. 17 is a partial view showing a state where a second damper is open.

FIG. 16 is a partial view showing a state where a second damper 633 is closed. FIG. 17 is a partial view showing a state where a second damper 633 is open.

The second damper 633 may be disposed at an inlet of the second duct 640, that is, a path of air flow between the damper device 630 and the second duct 640 the second damper 633 may be coupled to a body of the damper device 630 by a hinge mechanism. Accordingly, the second damper 633 may be hingedly rotated to selectively open and close the inlet of the second duct 640. The hinge rotation of the second damper 633 may be controlled by the controller.

When the dishwasher performs the washing mode, the first damper 632 may open the first discharge hole 631 and the second damper 633 may close the inlet of the second duct 640. This is realized by the controller controlling the hinge rotation of the first damper 632 and the second damper 633.

Accordingly, when the dishwasher performs the washing mode, the first discharge hole 631 may be open and the inlet of the second duct 640 may be closed so that the air flowing into the air flow part 600 may be discharged to the outside of the tub 2. So, in the washing mode, the air forcibly flowing in the air flow part 600 may be blocked by the second damper 633 to be discharged to the base 8 through the first discharge hole 631, not to be introduced into the tub 2.

When the dishwasher performs the drying mode, the first damper 632 may close the first discharge hole 631 and the second damper 633 may open the inlet of the second duct 640. Also, this may be realized by the controller controlling the hinge rotation of the first damper 632 and the second damper 633.

Accordingly, when the dishwasher performs the drying mode, the first discharge hole 631 may be closed and the inlet of the second duct 640 may be open so that the air flowing into the air flow part 600 may be introduced into the tub 2.

Due to this structure, the air forcibly flowing in the air flow part 600 may be blocked by the first damper 632 not to be discharged outside. In the drying mode, the air forcibly blown by the blowing fan 620 may circulate the tub 2 and the air flow part 600. Since the air circulates the tub 2 smoothly, evaporation of wash water on the surfaces of the dishes accommodated in the tub 2 may be promoted by the circulating air to effectively reduce the drying time, thereby improving drying efficiency of the dishwasher.

In an embodiment, the path of the air forcibly flowing may be changed by the damper device 630. The air forcibly flowing in the air flow part 600 may not be introduced to the tub in the washing mode but may be introduced to the tub 2 in the drying mode. Accordingly, the air cooled to be a low temperature air while passing through the second heat exchanger 220 and the third heat exchanger 230 in the washing mode may not be introduced to the tub 2 but discharged outside so that the tub 2 may not be cooled by the low temperature air, thereby improving washing efficiency of the dishwasher.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. A dishwasher comprising:
a tub defining a washing space; and
a heat pump configured to heat water introduced into the tub,
wherein the heat pump comprises:
a compressor configured to compress refrigerant, a first heat exchanger configured to receive the refrigerant from the compressor and configured to heat water introduced into the tub,
a first expansion valve configured to receive the refrigerant from the first heat exchanger and configured to expand the refrigerant,
a second heat exchanger configured to receive the refrigerant from the first expansion valve,
a second expansion valve disposed in parallel with the first expansion valve and configured to receive the refrigerant from the first heat exchanger,
a third heat exchanger disposed in parallel with the second heat exchanger and configured to receive the refrigerant from the second expansion valve, and
a four way valve connected with the compressor, the first heat exchanger, the second heat exchanger and the third heat exchanger and configured to change a flow path of the refrigerant.

2. The dishwasher of claim 1, wherein the heat pump comprises:
a first pipe connecting the four way valve with the compressor;
a second pipe connecting the four way valve with the first heat exchanger;
a third pipe connecting the four way valve with the second heat exchanger;
a fourth pipe connecting the four way valve with the third heat exchanger; and
a fifth pipe connecting the second heat exchanger with the compressor, and
wherein the third pipe is connected with the fifth pipe.

3. The dishwasher of claim 2, wherein a first check valve is provided in the third pipe and configured to block the refrigerant from flowing at the four way valve from the fifth pipe.

4. The dishwasher of claim 3, wherein the heat pump comprises:
a bypass pipe connected to both sides of the second expansion valve; and
a second check valve disposed at the bypass pipe and configured to block the refrigerant from flowing from an inlet of the second expansion valve to an outlet of the second expansion valve.

5. The dishwasher of claim 4, wherein the heat pump comprises:
a sixth pipe having a side connected to the first heat exchanger and an opposite side connected with the first expansion valve, the second expansion valve, and the bypass pipe; and
a third check valve disposed at the sixth pipe and configured to block the refrigerant from flowing to the first heat exchanger from at least one of the first expansion valve, the second expansion valve, or the bypass pipe.

6. The dishwasher of claim 5, further comprising:
a spray arm provided at the tub and configured to spray water;
wherein water introduced from the tub is heated based on the water passing through the first heat exchanger and being transferred to the tub to be sprayed through the spray arm.

7. The dishwasher of claim 5, wherein, the four way valve is configured to, based on the dishwasher performing a washing mode, connect the first pipe with the second pipe and connect the third pipe with the fourth pipe.

8. The dishwasher of claim 7, wherein, based on the dishwasher performing the washing mode:

the refrigerant discharged from the compressor is introduced to the first heat exchanger after passing through the first pipe and the second pipe, the refrigerant discharged from the second heat exchanger is introduced to the compressor after passing through the fifth pipe, and the refrigerant discharged from the third heat exchanger is introduced to the compressor after sequentially passing through the fourth pipe, the third pipe and the fifth pipe.

9. The dishwasher of claim 7, wherein, the first heat exchanger is configured to, based on the dishwasher performing the washing mode, operate as a condenser configured to heat water and condense the refrigerant by transmitting heat to the water from the refrigerant, and wherein the second heat exchanger and the third heat exchanger are configured to, based on the dishwasher performing the washing mode, operate as an evaporator configured to evaporate the refrigerant by transferring heat to the refrigerant from air.

10. The dishwasher of claim 5, wherein the four way valve is configured to, based on the dishwasher performing a drying mode, connect the first pipe with the fourth pipe and separate the second pipe and the third pipe from the first pipe and the fourth pipe.

11. The dishwasher of claim 5, wherein, based on the dishwasher performing a drying mode:

the refrigerant discharged from the compressor is introduced to the third heat exchanger after passing through the first pipe and the fourth pipe;

the refrigerant discharged from the second heat exchanger is introduced to the compressor after passing through the fifth pipe; and the first check valve and the third check valve block the refrigerant from flowing into the first heat exchanger.

12. The dishwasher of claim 11, wherein the second heat exchanger is configured to, based on the dishwasher performing the drying mode, operate as an evaporator configured to evaporate the refrigerant by transferring heat to the refrigerant from air, and wherein the third heat exchanger is configured to, based on the dishwasher performing the drying mode, operate as a condenser configured to heat air and condense the refrigerant by transferring heat to the air from the refrigerant.

13. The dishwasher of claim 5, wherein the second expansion valve is open based on the dishwasher performing a washing mode, and the second expansion valve is closed based on the dishwasher performing a drying mode.

14. The dishwasher of claim 2, wherein the heat pump comprises a blowing fan facing the second heat exchanger and the third heat exchanger and configured to blow air toward the second heat exchanger and the third heat exchanger.

15. The dishwasher of claim 14, wherein the blowing fan is configured to blow air introduced from the tub toward the second heat exchanger and the third heat exchanger, wherein, based on the dishwasher performing a washing mode, air having passed through the third heat exchanger is discharged to outside of the tub, and wherein, based on the dishwasher performing a drying mode, the air having passed through the third heat exchanger is introduced to the tub.

16. A heat pump for a dishwasher, the heat pump comprising:

a compressor configured to compress refrigerant;

a first heat exchanger configured to receive the refrigerant from the compressor and configured to heat water introduced into a tub of the dishwasher;

a first expansion valve configured to receive the refrigerant from the first heat exchanger and configured to expand the refrigerant;

a second heat exchanger configured to receive the refrigerant from the first expansion valve;

a second expansion valve disposed in parallel with the first expansion valve and configured to receive the refrigerant from the first heat exchanger;

a third heat exchanger disposed in parallel with the second heat exchanger and configured to receive the refrigerant from the second expansion valve;

a four way valve connected with the compressor, the first heat exchanger, the second heat exchanger, and the third heat exchanger and configured to change a flow path the refrigerant; and a blowing fan facing the second heat exchanger and the third heat exchanger and configured to blow air toward the second heat exchanger and the third heat exchanger.

17. The heat pump of claim 16, wherein the first heat exchanger is configured to, based on the dishwasher performing a washing mode, operate as a condenser configured to heat water and condense the refrigerant by transmitting heat to the water from the refrigerant, wherein the second heat exchanger and the third heat exchanger are configured to, based on the dishwasher performing the washing mode, operate as an evaporator configured to evaporate the refrigerant by transferring heat to the refrigerant from air, wherein the second heat exchanger is configured to, based on the dishwasher performing a drying mode, operate as an evaporator configured to evaporate the refrigerant by transferring heat to the refrigerant from air, wherein the third heat exchanger is configured to, based on the dishwasher performing the drying mode, operate as a condenser configured to heat air and condense the refrigerant by transferring heat to the air from the refrigerant, and wherein, based on the dishwasher performing the drying mode, flow of the refrigerant into the first heat exchanger is blocked to limit heat exchange between the refrigerant and water.

18. The heat pump of claim 16, further comprising:

a first pipe connecting the four way valve with the compressor;

a second pipe connecting the four way valve with the first heat exchanger;

a third pipe connecting the four way valve with the second heat exchanger;

a fourth pipe connecting the four way valve with the third heat exchanger; and a fifth pipe connecting the second heat exchanger with the compressor, and wherein the third pipe is connected with the fifth pipe.

19. The heat pump of claim 18, wherein a first check valve is provided in the third pipe and configured to block the refrigerant from flowing at the four way valve from the fifth pipe.

20. The heat pump of claim 16, further comprising:

a bypass pipe connected to both sides of the second expansion valve; and a second check valve disposed at the bypass pipe and configured to block the refrigerant from flowing from an inlet of the second expansion valve to an outlet of the second expansion valve.

\* \* \* \* \*